United States Patent
Kadous et al.

(10) Patent No.: US 11,032,841 B2
(45) Date of Patent: *Jun. 8, 2021

(54) DOWNLINK ACTIVE SET MANAGEMENT FOR MULTIPLE-INPUT MULTIPLE-OUTPUT COMMUNICATIONS

(71) Applicant: XCOM Labs, Inc., San Diego, CA (US)

(72) Inventors: Tamer Adel Kadous, San Diego, CA (US); Michael Mingxi Fan, San Diego, CA (US)

(73) Assignee: XCOM Labs, Inc., San Diego, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/395,837

(22) Filed: Apr. 26, 2019

(65) Prior Publication Data

US 2020/0344790 A1  Oct. 29, 2020

(51) Int. Cl.
*H04L 12/00* (2006.01)
*H04W 72/12* (2009.01)
*H04W 24/02* (2009.01)
*H04B 7/0413* (2017.01)
*H04B 7/024* (2017.01)

(52) U.S. Cl.
CPC ........ *H04W 72/1289* (2013.01); *H04B 7/024* (2013.01); *H04B 7/0413* (2013.01); *H04W 24/02* (2013.01)

(58) Field of Classification Search
None
See application file for complete search history.

(56) References Cited

U.S. PATENT DOCUMENTS

| 6,636,568 B2 | 10/2003 | Kadous |
| 6,801,580 B2 | 10/2004 | Kadous |
| 6,873,606 B2 | 3/2005 | Agrawal |
| 6,917,821 B2 | 7/2005 | Kadous |
| 6,928,062 B2 | 8/2005 | Krishnan |

(Continued)

OTHER PUBLICATIONS

3GPP RP-170750, New WID: Further Enhancements to Coordinated Multi-Point (CoMP) Operation for LTE, Mar. 2017.

(Continued)

*Primary Examiner* — Kenny S Lin
*Assistant Examiner* — Lionel Preval
(74) *Attorney, Agent, or Firm* — Knobbe Martens Olson & Bear LLP

(57) ABSTRACT

Aspects of the disclosure relate to an active set management scheme implemented by a scheduler in a multiple-input multiple-output (MIMO) network that minimizes capacity and interference issues. For example, the scheduler can initially group each base station into a separate active set. The scheduler can then analyze each active set to determine whether the active set is a good or bad based on the level of interference in and the number of MIMO transmit dimensions available in the respective active set. If the scheduler determines that an active set is a bad, the scheduler can determine a set of metrics that each represent a capacity and link quality that would result if the bad active set is combined with another active set. Based on the set of metrics, the scheduler can combine the bad active set with another active set, and repeat this process until no bad active sets remain.

24 Claims, 13 Drawing Sheets

(56) References Cited

U.S. PATENT DOCUMENTS

| | | | |
|---|---|---|---|
| 7,020,073 | B2 | 3/2006 | Kadous |
| 7,039,001 | B2 | 5/2006 | Krishnan |
| 7,042,857 | B2 | 5/2006 | Krishnan |
| 7,069,037 | B2 | 6/2006 | Lott |
| 7,095,790 | B2 | 8/2006 | Krishnan |
| 7,145,940 | B2 | 12/2006 | Gore |
| 7,167,684 | B2 | 1/2007 | Kadous |
| 7,177,351 | B2 | 2/2007 | Kadous |
| 7,184,713 | B2 | 2/2007 | Kadous |
| 7,194,041 | B2 | 3/2007 | Kadous |
| 7,206,598 | B2 | 4/2007 | Attar |
| 7,236,535 | B2 | 6/2007 | Subramaniam |
| 7,376,209 | B2 | 5/2008 | Namgoong |
| 7,418,046 | B2 | 8/2008 | Gore |
| 7,428,269 | B2 | 9/2008 | Sampath |
| 7,457,639 | B2 | 11/2008 | Subramaniam |
| 7,463,576 | B2 | 12/2008 | Krishnan |
| 7,477,693 | B2 | 1/2009 | Subramaniam |
| 7,508,748 | B2 | 3/2009 | Kadous |
| 7,525,909 | B2 | 4/2009 | Fan |
| 7,567,621 | B2 | 7/2009 | Sampath |
| 7,606,326 | B2 | 10/2009 | Krishnan |
| 7,668,125 | B2 | 2/2010 | Kadous |
| 7,675,886 | B2 | 3/2010 | Agrawal |
| 7,719,991 | B2 | 5/2010 | Bhushan |
| 7,729,714 | B2 | 6/2010 | Black |
| 7,738,906 | B2 | 6/2010 | Attar |
| 7,890,144 | B2 | 2/2011 | Subramaniam |
| 7,903,615 | B2 | 3/2011 | Gorokhov |
| 7,940,663 | B2 | 5/2011 | Kadous |
| 7,948,959 | B2 | 5/2011 | Wang |
| 7,974,359 | B2 | 7/2011 | Gorokhov |
| 8,014,331 | B2 | 9/2011 | Sarkar |
| 8,073,068 | B2 | 12/2011 | Kim |
| 8,077,654 | B2 | 12/2011 | Sutivong |
| 8,077,691 | B2 | 12/2011 | Kadous |
| 8,098,635 | B2 | 1/2012 | Montojo |
| 8,098,767 | B2 | 1/2012 | Mirbagheri |
| 8,107,517 | B2 | 1/2012 | Naguib |
| 8,139,672 | B2 | 3/2012 | Gore |
| 8,160,596 | B2 | 4/2012 | Black |
| 8,204,530 | B2 | 6/2012 | Gorokhov |
| 8,229,423 | B2 | 7/2012 | Sarkar |
| 8,306,096 | B2 | 11/2012 | Sampath |
| 8,331,310 | B2 | 12/2012 | Wang |
| 8,331,892 | B2 | 12/2012 | Kadous |
| 8,351,456 | B2 | 1/2013 | Kadous |
| 8,385,433 | B2 | 2/2013 | Wang |
| 8,385,465 | B2 | 2/2013 | Kadous |
| 8,391,196 | B2 | 3/2013 | Gorokhov |
| 8,391,413 | B2 | 3/2013 | Mantravadi |
| 8,396,152 | B2 | 3/2013 | Attar |
| 8,451,740 | B2 | 5/2013 | Sampath |
| 8,451,776 | B2 | 5/2013 | Dayal |
| 8,452,011 | B2 | 5/2013 | Guo |
| 8,457,152 | B2 | 6/2013 | Gorokhov |
| 8,462,859 | B2 | 6/2013 | Sampath |
| 8,498,192 | B2 | 7/2013 | Bhushan |
| 8,537,875 | B2 | 9/2013 | Soriaga |
| 8,576,760 | B2 | 11/2013 | Gorokhov |
| 8,605,729 | B2 | 12/2013 | Dayal |
| 8,611,325 | B2 | 12/2013 | Black |
| 8,619,717 | B2 | 12/2013 | Agrawal |
| 8,634,435 | B2 | 1/2014 | Kadous |
| 8,635,645 | B2 | 1/2014 | Krishnamoorthi |
| 8,639,190 | B2 | 1/2014 | Gore |
| 8,654,705 | B2 | 2/2014 | Wang |
| 8,654,715 | B2 | 2/2014 | Wang |
| 8,655,400 | B2 | 2/2014 | Kadous |
| 8,676,209 | B2 | 3/2014 | Gorokhov |
| 8,724,545 | B2 | 5/2014 | Dayal |
| 8,724,555 | B2 | 5/2014 | Krishnan |
| 8,732,272 | B2 | 5/2014 | Deshpande |
| 8,744,018 | B2 | 6/2014 | Chen |
| 8,760,994 | B2 | 6/2014 | Wang |
| 8,767,885 | B2 | 7/2014 | Sampath |
| 8,825,860 | B2 | 9/2014 | Linsky |
| 8,830,934 | B2 | 9/2014 | Banister |
| 8,831,156 | B2 | 9/2014 | Liang |
| 8,839,079 | B2 | 9/2014 | Chen |
| 8,842,693 | B2 | 9/2014 | Agrawal |
| 8,848,607 | B2 | 9/2014 | Wang |
| 8,855,001 | B2 | 10/2014 | Gorokhov |
| 8,879,440 | B2 | 11/2014 | Guo |
| 8,879,445 | B2 | 11/2014 | Sadek |
| 8,885,744 | B2 | 11/2014 | Kadous |
| 8,886,126 | B2 | 11/2014 | Mantravadi |
| 8,886,239 | B2 | 11/2014 | Dayal |
| 8,891,436 | B2 | 11/2014 | Zhang |
| 8,897,181 | B2 | 11/2014 | Wang |
| 8,897,188 | B2 | 11/2014 | Black |
| 8,897,220 | B2 | 11/2014 | Kadous |
| 8,897,256 | B2 | 11/2014 | Cherian |
| 8,903,021 | B2 | 12/2014 | Mantravadi |
| 8,908,496 | B2 | 12/2014 | Kadous |
| 8,923,109 | B2 | 12/2014 | Wang |
| 8,923,208 | B2 | 12/2014 | Dayal |
| 8,948,095 | B2 | 2/2015 | Black |
| 8,948,147 | B2 | 2/2015 | Zheng |
| 8,954,063 | B2 | 2/2015 | Sarkar |
| 8,971,461 | B2 | 3/2015 | Sampath |
| 8,971,823 | B2 | 3/2015 | Gore |
| 9,007,942 | B2 | 4/2015 | Zhao |
| 9,088,389 | B2 | 7/2015 | Gorokhov |
| 9,106,287 | B2 | 8/2015 | Wang |
| 9,113,488 | B2 | 8/2015 | Oguz |
| 9,119,217 | B2 | 8/2015 | Black |
| 9,136,974 | B2 | 9/2015 | Gorokhov |
| 9,143,957 | B2 | 9/2015 | Sadek |
| 9,144,036 | B2 | 9/2015 | Gorokhov |
| 9,144,084 | B2 | 9/2015 | Sadek |
| 9,148,256 | B2 | 9/2015 | Sampath |
| 9,154,179 | B2 | 10/2015 | Gudem |
| 9,154,211 | B2 | 10/2015 | Sampath |
| 9,155,106 | B2 | 10/2015 | Krishnan |
| 9,161,232 | B2 | 10/2015 | Linsky |
| 9,161,233 | B2 | 10/2015 | Wang |
| 9,172,402 | B2 | 10/2015 | Gudem |
| 9,172,453 | B2 | 10/2015 | Wang |
| 9,179,319 | B2 | 11/2015 | Gore |
| 9,184,870 | B2 | 11/2015 | Sampath |
| 9,185,718 | B2 | 11/2015 | Kadous |
| 9,185,720 | B2 | 11/2015 | Mantravadi |
| 9,226,173 | B2 | 12/2015 | Sadek |
| 9,246,560 | B2 | 1/2016 | Sampath |
| 9,253,658 | B2 | 2/2016 | Sadek |
| 9,264,972 | B2 | 2/2016 | Fan |
| 9,277,564 | B2 | 3/2016 | Wang |
| 9,282,462 | B2 | 3/2016 | Dayal |
| 9,307,544 | B2 | 4/2016 | Gore |
| 9,398,602 | B2 | 7/2016 | Kadous |
| 9,408,220 | B2 | 8/2016 | Gore |
| 9,450,638 | B2 | 9/2016 | Yan |
| 9,451,480 | B2 | 9/2016 | Huang |
| 9,461,736 | B2 | 10/2016 | Bhushan |
| 9,474,075 | B2 | 10/2016 | Yavuz |
| 9,497,495 | B2 | 11/2016 | Krishnamoorthi |
| 9,509,452 | B2 | 11/2016 | Liang |
| 9,578,649 | B2 | 2/2017 | Dayal |
| 9,585,156 | B2 | 2/2017 | Bhattad |
| 9,609,649 | B2 | 3/2017 | Fan |
| 9,660,776 | B2 | 5/2017 | Kadous |
| 9,673,837 | B2 | 6/2017 | Xue |
| 9,699,794 | B2 | 7/2017 | Lee et al. |
| 9,750,014 | B2 | 8/2017 | Sadek |
| 9,788,361 | B2 | 10/2017 | Valliappan |
| 9,832,785 | B2 | 11/2017 | Kadous |
| 9,860,033 | B2 | 1/2018 | Kadous |
| 9,867,194 | B2 | 1/2018 | Kadous |
| 9,924,368 | B2 | 3/2018 | Valliappan |
| 9,936,400 | B2 | 4/2018 | Lee |
| 9,954,668 | B2 | 4/2018 | Lee |
| 10,044,438 | B2 | 8/2018 | Kadous |
| 10,044,459 | B2 | 8/2018 | Chendamarai Kannan |

(56) References Cited

U.S. PATENT DOCUMENTS

| | | |
|---|---|---|
| 10,091,789 B2 | 10/2018 | Valliappan |
| 10,178,649 B2 | 1/2019 | Liu |
| 10,182,404 B2 | 1/2019 | Prakash |
| 10,201,014 B2 | 2/2019 | Kadous |
| 10,218,406 B2 | 2/2019 | Liu |
| 10,219,235 B2 | 2/2019 | Patel |
| 10,219,252 B2 | 2/2019 | Chendamarai Kannan |
| 10,219,300 B2 | 2/2019 | Gorokhov |
| 10,225,818 B2 | 3/2019 | Liu |
| 10,756,782 B1 * | 8/2020 | Kadous ................. H04W 24/02 |
| 2004/0121730 A1 | 6/2004 | Kadous |
| 2006/0203794 A1 | 9/2006 | Sampath |
| 2006/0229089 A1 | 10/2006 | Tokgoz |
| 2007/0041457 A1 | 2/2007 | Kadous |
| 2007/0071147 A1 | 3/2007 | Sampath |
| 2007/0165738 A1 | 7/2007 | Barriac |
| 2008/0025241 A1 | 1/2008 | Bhushan |
| 2008/0112495 A1 | 5/2008 | Gore |
| 2008/0188234 A1 | 8/2008 | Gorokhov et al. |
| 2010/0003931 A1 | 1/2010 | Krishnan |
| 2010/0067422 A1 | 3/2010 | Kadous |
| 2010/0261482 A1 | 10/2010 | Guey |
| 2011/0007680 A1 | 1/2011 | Kadous |
| 2011/0007688 A1 | 1/2011 | Veeravalli |
| 2011/0256834 A1 | 10/2011 | Dayal |
| 2012/0077532 A1 | 3/2012 | Kadous |
| 2012/0113906 A1 | 5/2012 | Kadous |
| 2012/0140798 A1 | 6/2012 | Kadous |
| 2012/0213303 A1 | 8/2012 | Kadous |
| 2013/0201959 A1 | 8/2013 | Guo |
| 2013/0229990 A1 | 9/2013 | Fan |
| 2013/0315156 A1 | 11/2013 | Xiao et al. |
| 2014/0056239 A1 | 2/2014 | Zhang |
| 2014/0071894 A1 | 3/2014 | Kairouz |
| 2014/0079155 A1 | 3/2014 | Wang |
| 2014/0219117 A1 | 8/2014 | Meshkati |
| 2014/0219243 A1 | 8/2014 | Meshkati |
| 2014/0247814 A1 | 9/2014 | Zhang |
| 2014/0273884 A1 | 9/2014 | Mantravadi |
| 2014/0285684 A1 | 9/2014 | Huang |
| 2014/0362744 A1 | 12/2014 | Yan |
| 2015/0063150 A1 | 3/2015 | Sadek |
| 2015/0063151 A1 | 3/2015 | Sadek |
| 2015/0063323 A1 | 3/2015 | Sadek |
| 2015/0065152 A1 | 3/2015 | Sadek |
| 2015/0085686 A1 | 3/2015 | Chande |
| 2015/0133184 A1 | 5/2015 | Sadek |
| 2015/0139015 A1 | 5/2015 | Kadous |
| 2015/0163823 A1 | 6/2015 | Sadek |
| 2015/0223077 A1 | 8/2015 | Fan |
| 2015/0282077 A1 | 10/2015 | Yavuz |
| 2015/0319702 A1 | 11/2015 | Patel |
| 2015/0326382 A1 | 11/2015 | Li |
| 2015/0350919 A1 | 12/2015 | Patel |
| 2016/0088625 A1 | 3/2016 | Kadous |
| 2016/0095039 A1 | 3/2016 | Valliappan |
| 2016/0095040 A1 | 3/2016 | Valliappan |
| 2016/0128130 A1 | 5/2016 | Sadek |
| 2016/0353482 A1 | 12/2016 | Valliappan |
| 2017/0048047 A1 | 2/2017 | Kadous |
| 2017/0055260 A1 | 2/2017 | Valliappan |
| 2017/0055285 A1 | 2/2017 | Valliappan |
| 2017/0064657 A1 | 3/2017 | Chendamarai Kannan |
| 2017/0064729 A1 | 3/2017 | Sadek |
| 2017/0093545 A1 | 3/2017 | Kadous |
| 2017/0094680 A1 | 3/2017 | Patel |
| 2017/0135029 A1 | 5/2017 | Chendamarai Kannan |
| 2017/0142705 A1 | 5/2017 | Meshkati |
| 2017/0142713 A1 | 5/2017 | Chendamarai Kannan |
| 2017/0202022 A1 | 7/2017 | Chendamarai Kannan |
| 2017/0222771 A1 | 8/2017 | Chendamarai Kannan |
| 2017/0223737 A1 | 8/2017 | Patel |
| 2017/0251473 A1 | 8/2017 | Xue |
| 2017/0280382 A1 | 9/2017 | Radulescu |
| 2017/0311316 A1 | 10/2017 | Chendamarai Kannan |
| 2017/0311343 A1 | 10/2017 | Chendamarai Kannan |
| 2017/0311346 A1 | 10/2017 | Chendamarai Kannan |
| 2017/0318586 A1 | 11/2017 | Wang |
| 2017/0332288 A1 | 11/2017 | Sadek |
| 2017/0359263 A1 | 12/2017 | Barghi |
| 2017/0359815 A1 | 12/2017 | Chendamarai Kannan |
| 2018/0006703 A1 | 1/2018 | Kim |
| 2018/0042018 A1 | 2/2018 | Bhushan |
| 2018/0054348 A1 | 2/2018 | Luo |
| 2018/0054382 A1 | 2/2018 | Luo |
| 2018/0054762 A1 | 2/2018 | Kadous |
| 2018/0054780 A1 | 2/2018 | Radulescu |
| 2018/0054783 A1 | 2/2018 | Luo |
| 2018/0054811 A1 | 2/2018 | Luo |
| 2018/0054812 A1 | 2/2018 | Luo |
| 2018/0054830 A1 | 2/2018 | Luo |
| 2018/0054832 A1 | 2/2018 | Luo |
| 2018/0063799 A1 | 3/2018 | Sadek |
| 2018/0070243 A1 | 3/2018 | Liu |
| 2018/0084430 A1 | 3/2018 | Patel |
| 2018/0098225 A1 | 4/2018 | Damnjanovic |
| 2018/0098335 A1 | 4/2018 | Sun |
| 2018/0103461 A1 | 4/2018 | Sun |
| 2018/0103472 A1 | 4/2018 | Zhang |
| 2018/0109957 A1 | 4/2018 | Fan |
| 2018/0110022 A1 | 4/2018 | Fan |
| 2018/0110063 A1 | 4/2018 | Fan |
| 2018/0115907 A1 | 4/2018 | Damnjanovic |
| 2018/0115933 A1 | 4/2018 | Radulescu |
| 2018/0123859 A1 | 5/2018 | Liu et al. |
| 2018/0124770 A1 | 5/2018 | Yerramalli |
| 2018/0124776 A1 | 5/2018 | Yerramalli |
| 2018/0124777 A1 | 5/2018 | Yerramalli |
| 2018/0124820 A1 | 5/2018 | Sun |
| 2018/0132236 A1 | 5/2018 | Kadous |
| 2018/0139616 A1 | 5/2018 | Khoshnevisan |
| 2018/0139618 A1 | 5/2018 | Yerramalli |
| 2018/0139782 A1 | 5/2018 | Sadek |
| 2018/0146480 A1 | 5/2018 | Chendamarai Kannan |
| 2018/0160328 A1 | 6/2018 | Chendamarai Kannan |
| 2018/0160389 A1 | 6/2018 | Yerramalli |
| 2018/0167848 A1 | 6/2018 | Lei |
| 2018/0167968 A1 | 6/2018 | Liu |
| 2018/0175986 A1 | 6/2018 | Chendamarai Kannan |
| 2018/0176946 A1 | 6/2018 | Sun |
| 2018/0213560 A1 | 7/2018 | Naghshvar |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0241494 A1 | 8/2018 | Chendamarai Kannan |
| 2018/0241526 A1 | 8/2018 | Chendamarai Kannan |
| 2018/0242163 A1 | 8/2018 | Patel |
| 2018/0242223 A1 | 8/2018 | Chendamarai Kannan |
| 2018/0242232 A1 | 8/2018 | Chendamarai Kannan |
| 2018/0242348 A1 | 8/2018 | Chendamarai Kannan |
| 2018/0249380 A1 | 8/2018 | Zhang |
| 2018/0249496 A1 | 8/2018 | Radulescu |
| 2018/0255561 A1 | 9/2018 | Barghi |
| 2018/0255584 A1 | 9/2018 | Sun |
| 2018/0269939 A1 * | 9/2018 | Hu ..................... H04W 74/006 |
| 2018/0269962 A1 | 9/2018 | Liu |
| 2018/0279134 A1 | 9/2018 | Malik |
| 2018/0279156 A1 | 9/2018 | Malik |
| 2018/0279212 A1 | 9/2018 | Malik |
| 2018/0279292 A1 | 9/2018 | Luo |
| 2018/0287762 A1 | 10/2018 | Sun |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0288781 A1 | 10/2018 | Akkarakaran |
| 2018/0294911 A1 | 10/2018 | Sun |
| 2018/0295622 A1 | 10/2018 | Sadek |
| 2018/0302186 A1 | 10/2018 | Reddy |
| 2018/0302201 A1 | 10/2018 | Yoo |
| 2018/0302796 A1 | 10/2018 | Zhang |

(56) References Cited

U.S. PATENT DOCUMENTS

| | | |
|---|---|---|
| 2018/0309479 A1 | 10/2018 | Yerramalli |
| 2018/0310267 A1 | 10/2018 | Liu |
| 2018/0310341 A1 | 10/2018 | Yerramalli |
| 2018/0317093 A1 | 11/2018 | Li |
| 2018/0317259 A1 | 11/2018 | Islam |
| 2018/0324713 A1 | 11/2018 | Yoo |
| 2018/0331870 A1 | 11/2018 | Sun |
| 2018/0332551 A1 | 11/2018 | Liu |
| 2018/0343156 A1 | 11/2018 | Malik |
| 2018/0343588 A1 | 11/2018 | Sadek |
| 2018/0343676 A1 | 11/2018 | Yerramalli |
| 2018/0352563 A1 | 12/2018 | Liu |
| 2018/0359656 A1 | 12/2018 | Liu |
| 2018/0359685 A1 | 12/2018 | Li |
| 2018/0367362 A1 | 12/2018 | Sun |
| 2018/0368089 A1 | 12/2018 | Yerramalli |
| 2018/0376503 A1 | 12/2018 | Sun |
| 2019/0007946 A1 | 1/2019 | Yerramalli |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020527 A1 | 1/2019 | Lei |
| 2019/0020528 A1 | 1/2019 | Lei |
| 2019/0020529 A1 | 1/2019 | Lei |
| 2019/0021080 A1 | 1/2019 | Lei |
| 2019/0028999 A1 | 1/2019 | Yerramalli |
| 2019/0029019 A1 | 1/2019 | Zhang |
| 2019/0037376 A1 | 1/2019 | Liu |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037525 A1 | 1/2019 | Liu |
| 2019/0037603 A1 | 1/2019 | Damnjanovic |
| 2019/0053269 A1 | 2/2019 | Lei |
| 2019/0059001 A1 | 2/2019 | Yerramalli |
| 2019/0059102 A1 | 2/2019 | Yerramalli |
| 2019/0069325 A1 | 2/2019 | Yerramalli |
| 2019/0075576 A1 | 3/2019 | Eyuboglu et al. |
| 2019/0075597 A1 | 3/2019 | Yerramalli |

OTHER PUBLICATIONS

3GPP TR 36.741, Study on Further Enhancements to Coordinated Multi-Point (CoMP) Operation for LTE, V14.0.0, Mar. 2017.
Agrawal, et al., Dynamic Point Selection for LTE-Advanced: Algorithms and Performance, Wireless Communications and Networking Conference (WCNC), 2014 IEEE, Istanbul, Turkey, Apr. 2014, pp. 1392-1397.
Andrews, et al., Are We Approaching the Fundamental Limits of Wireless Network Densification?, IEEE Communications Magazine, vol. 54, No. 10, pp. 184-190, Oct. 2016.
Björnson, et al., Cooperative Multicell Precoding: Rate Region Characterization and Distributed Strategies with Instantaneous and Statistical CSI, IEEE Transactions on Signal Processing, vol. 58, No. 8, pp. 4298-4310, Aug. 2010.
Buzzi, et al., Cell-Free Massive MIMO: User-Centric Approach, IEEE Wireless Communications Letters, vol. 6, No. 6, pp. 706-709, Dec. 2017.
Checko, et al., Cloud RAN for Mobile Networks—a Technology Overview, IEEE Communications Surveys & Tutorials, vol. 17, No. 1, Sep. 2014.
Chen, et al., Channel Hardening and Favorable Propagation in Cell-Free Massive MIMO with Stochastic Geometry, version 1, 2017. Available at: http://arxiv.org/abs/1710.00395.
Chen, et al., Channel Hardening and Favorable Propagation in Cell-Free Massive MIMO with Stochastic Geometry, version 2, 2018. Available at: http://arxiv.org/abs/1710.00395.
Davydov, et al., Evaluation of Joint Transmission CoMP in C-RAN based LTE-A HetNets with Large Coordination Areas, Proc. GLOBECOM'14, Atlanta, U.S., Dec. 2013, pp. 801-806.
Forenza, et al., Achieving Large Multiplexing Gain in Distributed Antenna Systems via Cooperation with pCell Technology, 49th Asilomar Conference on Signals, Systems and Computers, Nov. 2015, IEEE, pp. 286-293.
Gesbert, et al., Multi-cell MIMO Cooperative Networks: A New Look at Interference, IEEE Journal on Selected Areas in Communications, vol. 28, No. 9, pp. 1380-1408, Dec. 2010.
Gilhousen, et al., On the Capacity of a Cellular CDMA system, IEEE Transactions on Vehicular Technology, vol. 40, No. 2, pp. 303-311, May 1991.
Interdonato, et al., How Much Do Downlink Pilots Improve Cell-Free Massive MIMO?, IEEE, 2016, 7 pages.
Larsson, et al., Massive MIMO for Next Generation Wireless Systems, Jan. 2014.
Marzetta, et al., Fundamentals of Massive MIMO, Cambridge University Press, Dec. 2016, Table of Contents.
Nayebi, et al., Precoding and Power Optimization in Cell-Free Massive MIMO Systems, IEEE Transactions on Wireless Communications, vol. 16, No. 7, pp. 4445-4459, Jul. 2017.
Ngo, et al., Cell-Free Massive MIMO Versus Small Cells, IEEE Transactions on Wireless Communications, vol. 16, No. 3, pp. 1834-1850, Mar. 2017.
Ngo, et al., On the Total Energy Efficiency of Cell-Free Massive MIMO, IEEE Transactions on Green Communications and Networking, vol. 2, No. 1, pp. 25-39, Mar. 2018.
Osseiran, et al., 5G Mobile and Wireless Communications Technology, Cambridge University Press, Oct. 2016, Ch. 9, Coordinated multi-point transmission in 5G.
Rohde & Schwarz, LTE Transmission Modes and Beamforming, White Paper, Jul. 2015.
Shamai, et al., Enhancing the Cellular Downlink Capacity via Co-processing at the Transmitting End, Proceedings of IEEE VTC-Spring, vol. 3,2001, pp. 1745-1749.
Sun, et al., Performance Evaluation of CS/CB for Coordinated Multipoint Transmission in LTE-A Downlink, Proceedings of IEEE PIMRC'12, Sydney, Australia, Sep. 2012, pp. 1061-1065.
Tanghe, et al., The Industrial Indoor Channel: Large-Scale and Temporal Fading at 900, 2400, and 5200 MHz, IEEE Transactions on Wireless Communications, vol. 7, No. 7, pp. 2740-2751, Jul. 2008.
Wu, et al., Cloud Radio Access Network (C-RAN): A Primer, IEEE Network, vol. 29, No. 1, pp. 35-41, Jan./Feb. 2015.
Wu, et al., Centralized and Distributed Schedulers for Non-Coherent Joint Transmission, Sep. 2018.
Zhou, et al., Distributed Wireless Communication System: A New Architecture for Future Public Wireless Access, IEEE Communications Magazine, vol. 41, No. 3, pp. 108-113, Mar. 2003.
International Search Report and Written Opinion for International Application No. PCT/US2020/029374, Notification dated Aug. 6, 2020.

\* cited by examiner

DOWNLINK ACTIVE SET MANAGEMENT FOR MULTIPLE-INPUT MULTIPLE-OUTPUT COMMUNICATIONS

BACKGROUND

Technical Field

Embodiments of this disclosure relate to wireless communication systems, such as cooperative multiple-input multiple output wireless communication systems.

Description of Related Technology

The types of modern computing devices continues to increase along with the differing and dynamic needs of each device. The wireless communication systems providing services to such devices are facing increasing constraints on resources and demands for quality and quantities of service. Accordingly, improvements in providing wireless communication services, such as in a multiple-input multiple-output system, are desired.

SUMMARY

One aspect of the disclosure provides a network system comprising a plurality of nodes, where each node is configured to communicate with one or more user equipment (UEs), and where each node initially corresponds to a separate active set. The network system further comprises a scheduler in communication with the plurality of nodes, the scheduler comprising a processor and computer-executable instructions, where the computer-executable instructions, when executed by the processor, cause the scheduler to: for a first active set, determine whether a number of available MIMO dimensions in the first active set exceeds a threshold value; determine a level of interference received at one or more UEs within the first active set; in response to a determination that at least one of (a) the number of available MIMO dimensions in the first active set does not exceed the threshold value or (b) a determination that the level of interference within the first active set exceeds a second threshold value, determine one or more metrics, each metric associated with the first active set and an active set other than the first active set; and combine the first active set with an active set associated with the highest metric in the one or more metrics.

The network system of the preceding paragraph can include any sub-combination of the following features: where a first node in the plurality of nodes corresponds to the first active set, where a second node in the plurality of nodes corresponds to a second active set, and where a first metric in the one or more metrics is associated with the first active set and the second active set; where the first metric is based on a number of MIMO dimensions provided by a combination of the first node and the second node; where the number of MIMO dimensions provided by the combination of the first node and the second node comprises a number of transmit streams collectively provided by the first node and the second node; where the first metric is based on a total number of available transmit streams collectively provided by the first node and the second node and a total number of available receive streams collectively provided by UEs served by either the first node or the second node; where the total number of available transmit streams comprises a minimum of a number of transmit antenna elements and a number of available transmission radio frequency (RF) chains collectively provided by the first node and the second node; where the first metric is based on a signal-to-noise ratio of a signal between the first node and a first UE in one or more UEs served by the second node; where the first metric is further based on a signal-to-noise ratio of a second signal between the second node and a second UE in one or more UEs served by the first node; where the first metric is based on a signal-to-leakage ratio of an energy of a signal from a combination of the first node and the second node to one or more UEs served by the combination over a leakage of the signal to one or more UEs not served by the combination; where the computer-executable instructions, when executed, further cause the scheduler to: apply, for each UE in one or more UEs served by the second node, a function to a signal-to-noise ratio of a signal between the first node and the respective UE served by the second node to form a first value, sum the first values, apply, for each UE in one or more UEs served by the first node, a function to a signal-to-noise ratio of a signal between the second node and the respective UE served by the first node to form a second value, sum the second values, and determine the first metric based on the summed first values and the summed second values; where the first metric is based on a level of interference between the first active set and the second active set; where the level of interference between the first active set and the second active set comprises a signal-to-leakage ratio associated with the first active set and the second active set; where the computer-executable instructions, when executed, further cause the scheduler to repeat operations to combine active sets until each active set has a number of available MIMO dimensions that exceeds the threshold value and has a level of interference that does not exceed the second threshold value; where the level of interference received at the one or more UEs within the first active set comprises a signal-to-leakage ratio (SLR) of the first active set; and where the SLR of the first active set comprises a ratio of a power of one or more signals transmitted by one or more of the plurality of nodes in the first active set to the one or more UEs within the first active set over a leakage of the one or more signals to one or more UEs not within the first active set.

Another aspect of the disclosure provides a computer-implemented method comprising: determining whether a number of available MIMO dimensions in a first active set exceeds a threshold value, where the first active set is associated with a node configured to serve one or more user equipment (UE) in the first active set; determining a level of interference received at one or more UEs within the first active set; in response to a determination that at least one of (a) the number of available MIMO dimensions in the first active set does not exceed the threshold value or (b) a determination that the level of interference within the first active set exceeds a second threshold value, determining one or more metrics, each metric associated with the first active set and an active set other than the first active set; and combining the first active set with an active set associated with the highest metric in the one or more metrics.

The computer-implemented method of the preceding paragraph can include any sub-combination of the following features: where a second node corresponds to a second active set, and where a first metric in the one or more metrics is associated with the first active set and the second active set; the first metric is based on a number of MIMO dimensions provided by a combination of the node and the second node; where the number of MIMO dimensions provided by the combination of the node and the second node comprises a number of transmit streams collectively provided by the node and the second node; where the first metric is based on a signal-to-noise ratio of a signal between the node and a first UE in one or more UEs served by the second node; where the first metric is further based on a signal-to-noise ratio of a second signal between the second node and a second UE in one or more UEs served by the first node; the first metric is based on a signal-to-leakage ratio of an energy of a signal from a combination of the first node and the second node to one or more UEs served by the combination over a leakage of the signal to one or more UEs not served by the combination; and where determining one or more metrics further comprises: applying, for each UE in one or more UEs served by the second node, a function to a signal-to-noise ratio of a signal between the node and the respective UE served by the second node to form a first value, summing the first values, applying, for each UE in one or more UEs served by the node, a function to a signal-to-noise ratio of a signal between the second node and the respective UE served by the node to form a second value, summing the second values, and determining the first metric based on the summed first values and the summed second values.

Another aspect of the disclosure provides non-transitory, computer-readable storage media comprising computer-executable instructions, where the computer-executable instructions, when executed by a scheduler in a baseband unit, cause the baseband unit to: determine whether a number of available MIMO dimensions in a first active set exceeds a threshold value, where the first active set is associated with a node configured to serve one or more user equipment (UE) in the first active set; determine a level of interference received at one or more UEs within the first active set; in response to a determination that at least one of (a) the number of available MIMO dimensions in the first active set does not exceed the threshold value or (b) a determination that the level of interference within the first active set exceeds a second threshold value, determine one or more metrics, each metric associated with the first active set and an active set other than the first active set; and combine the first active set with an active set associated with the highest metric in the one or more metrics.

Another aspect of the disclosure provides a network system comprising a plurality of nodes, where each node is configured to communicate with one or more user equipment (UEs), and where each node initially corresponds to a separate active set. The network system further comprises a scheduler in communication with the plurality of nodes, the scheduler comprising a processor and computer-executable instructions, where the computer-executable instructions, when executed by the processor, cause the scheduler to: for a first active set, determine whether a number of available MIMO dimensions in the first active set exceeds a threshold value; determine a level of interference received at one or more nodes in the plurality of nodes within the first active set; in response to a determination that at least one of (a) the number of available MIMO dimensions in the first active set does not exceed the threshold value or (b) a determination that the level of interference within the first active set exceeds a second threshold value, determine one or more metrics, each metric associated with the first active set and an active set other than the first active set; and combine the first active set with an active set associated with the highest metric in the one or more metrics.

The network system of the preceding paragraph can include any sub-combination of the following features: where a first node in the plurality of nodes corresponds to the first active set, where a second node in the plurality of nodes corresponds to a second active set, and where a first metric in the one or more metrics is associated with the first active set and the second active set; where the first metric is based on a number of MIMO dimensions provided by a combination of the first node and the second node; where the number of MIMO dimensions provided by the combination of the first node and the second node comprises a number of receive streams collectively provided by the first node and the second node; where the first metric is based on a total number of available receive streams collectively provided by the first node and the second node and a minimum of a total number of available transmit streams collectively provided by UEs served by either the first node or the second node and a number of receiver radio frequency (RF) chains at the first and second nodes; where the total number of available receive streams comprises a number of receive antenna elements collectively provided by the first node and the second node; where the first metric is based on a signal-to-noise ratio of a signal between the first node and a first UE in one or more UEs served by the second node; where the first metric is further based on a signal-to-noise ratio of a second signal between the second node and a second UE in one or more UEs served by the first node; where the first metric is based on a signal-to-leakage ratio of an energy of a signal from a combination of the first node and the second node to one or more UEs served by the combination over a leakage of the signal to one or more UEs not served by the combination; where the computer-executable instructions, when executed, further cause the scheduler to: apply, for each UE in one or more UEs served by the second node, a function to a signal-to-noise ratio of a signal between the first node and the respective UE served by the second node to form a first value, sum the first values, apply, for each UE in one or more UEs served by the first node, a function to a signal-to-noise ratio of a signal between the second node and the respective UE served by the first node to form a second value, sum the second values, and determine the first metric based on the summed first values and the summed second values; where the first metric is based on a level of interference between the first active set and the second active set; where the level of interference between the first active set and the second active set comprises a signal-to-leakage ratio associated with the first active set and the second active set; where the computer-executable instructions, when executed, further cause the scheduler to repeat operations to combine active sets until each active set has a number of available MIMO dimensions that exceeds the threshold value and has a level of interference that does not exceed the second threshold value; where the level of interference received at the one or more nodes in the plurality of nodes within the first active set comprises a signal-to-leakage ratio (SLR) of the first active set; and where the SLR of the first active set comprises a ratio of a power of one or more signals transmitted to one or more of the plurality of nodes in the first active set by the one or more UEs within the first active set over a leakage of the one or more signals to one or more UEs not within the first active set.

Another aspect of the disclosure provides a computer-implemented method comprising: determining whether a number of available MIMO dimensions in a first active set exceeds a threshold value, where the first active set is associated with a node configured to serve one or more user equipment (UE) in the first active set; determining a level of interference received at the node within the first active set; in response to a determination that at least one of (a) the number of available MIMO dimensions in the first active set does not exceed the threshold value or (b) a determination that the level of interference within the first active set exceeds a second threshold value, determining one or more metrics, each metric associated with the first active set and an active set other than the first active set; and combining the first active set with an active set associated with the highest metric in the one or more metrics.

The computer-implemented method of the preceding paragraph can include any sub-combination of the following features: where a second node corresponds to a second active set, and where a first metric in the one or more metrics is associated with the first active set and the second active set; where the first metric is based on a number of MIMO dimensions provided by a combination of the node and the second node; where the number of MIMO dimensions provided by the combination of the node and the second node comprises a number of receive streams collectively provided by the node and the second node; where the first metric is based on a signal-to-noise ratio of a signal between the node and a first UE in one or more UEs served by the second node; where the first metric is further based on a signal-to-noise ratio of a second signal between the second node and a second UE in one or more UEs served by the first node; where the first metric is based on a signal-to-leakage ratio of an energy of a signal from a combination of the first node and the second node to one or more UEs served by the combination over a leakage of the signal to one or more UEs not served by the combination; and where determining one or more metrics further comprises: applying, for each UE in one or more UEs served by the second node, a function to a signal-to-noise ratio of a signal between the node and the respective UE served by the second node to form a first value, summing the first values, applying, for each UE in one or more UEs served by the node, a function to a signal-to-noise ratio of a signal between the second node and the respective UE served by the node to form a second value, summing the second values, and determining the first metric based on the summed first values and the summed second values.

Another aspect of the disclosure provides non-transitory, computer-readable storage media comprising computer-executable instructions, where the computer-executable instructions, when executed by a scheduler in a baseband unit, cause the baseband unit to: determine whether a number of available MIMO dimensions in a first active set exceeds a threshold value, where the first active set is associated with a node configured to serve one or more user equipment (UE) in the first active set; determine a level of interference received at the node within the first active set; in response to a determination that at least one of (a) the number of available MIMO dimensions in the first active set does not exceed the threshold value or (b) a determination that the level of interference within the first active set exceeds a second threshold value, determine one or more metrics, each metric associated with the first active set and an active set other than the first active set; and combine the first active set with an active set associated with the highest metric in the one or more metrics.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
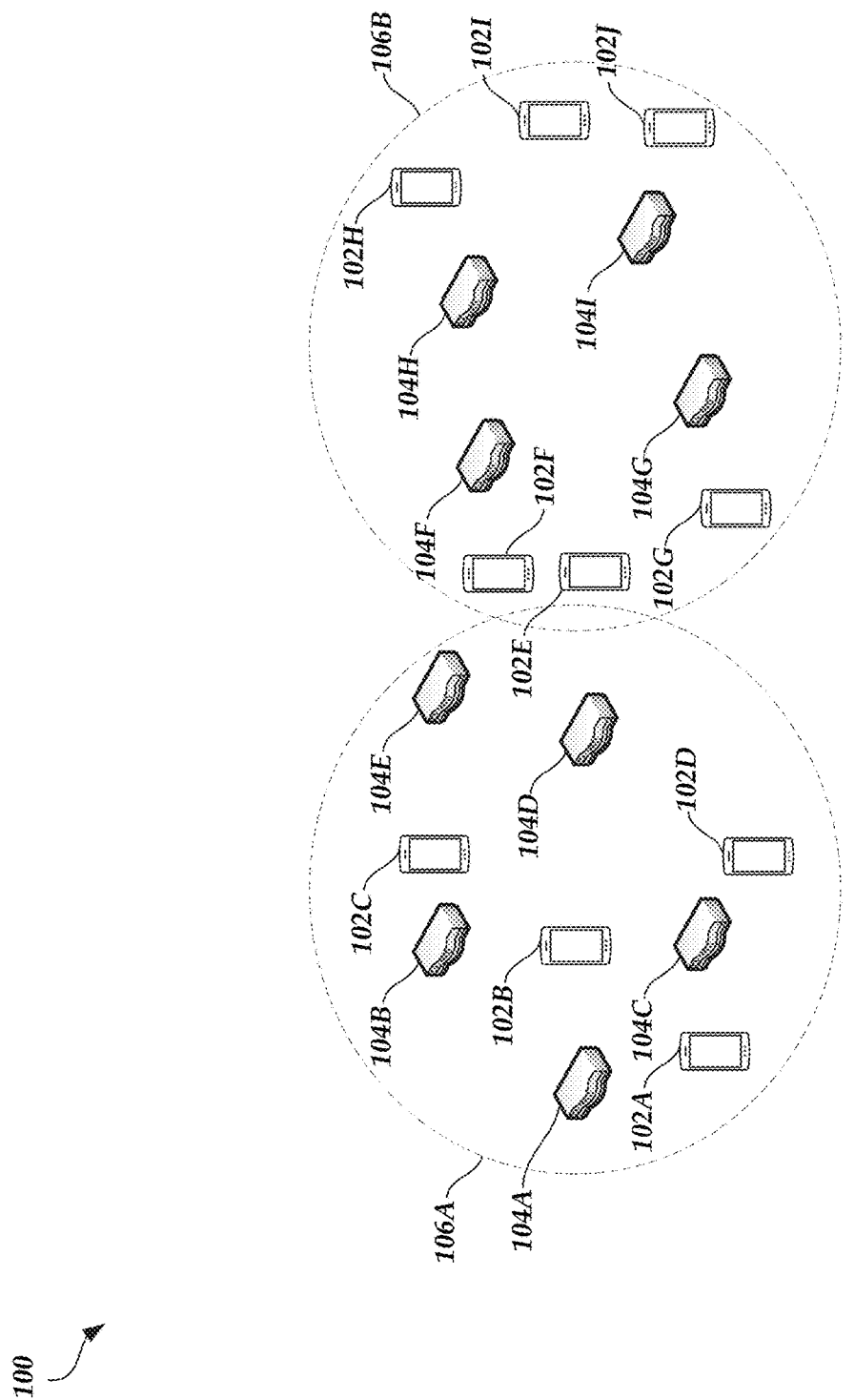
FIGS. 1A-1B are diagrams illustrating a cooperative MIMO network environment that includes UEs and nodes and the benefits provided by the active set management scheme according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

As wireless networks are increasingly used to run services sensitive to reliability and/or latency issues (e.g., media streaming, video chat, virtual reality, etc.), multi-antenna techniques have served as a prominent solution for minimizing such issues. For example, one type of multi-antenna solution is a traditional multiple-input multiple-output (MIMO) network in which transmitters and receivers each have multiple antennas over which communications are sent. However, it has become difficult for certain wireless devices (e.g., user equipment (UE), base stations, etc.) to support multiple antennas and/or proper spacing between antennas as the devices have evolved. Cooperative MIMO networks, on the other hand, can achieve the benefits of traditional MIMO networks without being constrained by whether the wireless devices can support multiple antennas.

For example, one or more wireless devices can be grouped together to create a virtual antenna array, and the grouped wireless devices together can act as a MIMO device.

One version of Cooperative MIMO is Coordinated Multipoint (CoMP) in which one or more transmit-receive points (TRPs) share data, channel state information, etc., coordinating downlink transmissions and jointly processing uplink transmissions. Because TRPs coordinate downlink transmissions, disruptions and/or interruptions caused by handing over a UE from one TRP to another can be avoided. In addition, the TRPs can work collectively to cover geographic areas that otherwise may not be covered by any single TRP. Thus, a CoMP network may provide a seamless area of coverage for a UE.

Often, certain TRPs and UEs are grouped together to form an active set. An active set can be associated with one or more TRPs and zero or more UEs. When grouped into an active set, TRPs in the active set only communicate with UEs in the active set, and vice-versa. Multiple active sets can be formed within the MIMO network. An active set in the MIMO network can overlap with another active set in the MIMO network. For example, one TRP can be in a first active set that serves a first group of UEs and can be in a second active set that serves a second group of UEs.

Identifying the TRPs and UEs that should be grouped to form an active set can be difficult, however. Depending on the number of TRPs and UEs in the MIMO network, there may be hundreds to thousands of possible combinations of base station and UE groupings. For example, if the MIMO network includes just 4 TRPs and 4 UEs, the number of possible combinations of TRP and UE groupings can be 123 assuming that each grouping includes at least one TRP and one UE.

Ideally, the MIMO network includes a single active set that includes all TRPs and all UEs in the MIMO network, and transmissions to and/or from UEs is jointly optimized. However, the complexity of scheduling jointly optimized transmissions and the TRP and/or UE processing latency involved for a single active set may be too high. Thus, multiple, smaller active sets may be formed to reduce the complexity and/or processing latency. Forming multiple, smaller active sets can introduce other issues, however. For example, certain groupings of TRPs and UEs may result in some TRPs and/or UEs suffering from a high level of interference, and thus such groupings should be avoided. Other groupings of TRPs and UEs may suffer from capacity issues (e.g., there may not be enough transmission dimensions for the TRPs to serve the UEs in the grouping), and thus such groupings should be avoided as well. However, it would be resource intensive, and therefore impractical, to iterate through each possible combination of groupings to identify those that do and do not result in high levels of interference and those that do and do not suffer from capacity issues. As illustrated above, it would be impractical to iterate through each possible combination of groupings even if the number of TRPs and UEs in the MIMO network is relatively small (e.g., 4 each).

Accordingly, aspects of the disclosure relate to an active set management scheme implemented by a scheduler in a MIMO network that identifies one or more groupings of base stations and UEs in a manner that avoids the issues described above. In particular, the active set management scheme described herein reduces the likelihood of interference or capacity issues and identifies one or more groupings without iterating through every possible grouping. Thus, implementation of the active management scheme described herein results in an improved MIMO network that can achieve high throughput, low latency, and/or high reliability while maintaining a reasonable network complexity (e.g., lower network overhead given that the scheduler does not need to iterate through all possible combinations of base station and UE groupings to achieve the high throughput, low latency, and/or high reliability benefits).

In an embodiment, the MIMO network includes a central processing system (e.g., a baseband unit (BBU) that includes a scheduler), one or more remote radio units (RRUs), and one or more UEs. For example, the RRUs may include multiple antennas, and one or more of the antennas may serve as a TRP. The RRU and/or a TRP may be referred to as a serving node or a base station. The base stations may each have one or more transmit antennas that each support one or more digital basebands. In some embodiments, each base station has the same number of transmit antennas. In other embodiments, some or all base stations may have a different number of transmit antennas than other base stations. Thus, the base stations may collectively be capable of transmitting N spatial beams, where N is the product of the number of base stations in the improved MIMO network and the number of transmit antennas operated by a single base station. The central processing system and/or the base stations can be collectively referred to herein as a "network system."

To implement the active set management scheme, the scheduler can initially group each base station into a separate active set. Thus, each base station may serve zero or more UEs. The scheduler can then analyze each active set to determine whether the active set is a good active set or a bad active set. An active set may be considered a bad active set if the number of available MIMO dimensions in the active set is below a threshold value (e.g., where the threshold value is based on a minimum number of MIMO dimensions needed to properly serve UE(s) in the active set) or if a level of interference in the active set is at or above a second threshold value. An active set is considered a good active set if the number of available MIMO dimensions in the active set is at or above the threshold value and if the level of interference in the active set is below the second threshold value.

If the scheduler determines that an active set is a bad active set, then the scheduler can determine, for each pair of the bad active set and another existing active set, a metric. Generally, the metric is a representation of a capacity and signal strength level that would result if the two active sets associated with the metric were combined into a single active set. After determining the metrics for pairs of the bad active set and other existing active sets, the scheduler can identify the highest metric and combine the two active sets associated with the highest metric (e.g., combine the bad active set with another active set). The scheduler can repeat these operations for each bad active set until all bad active sets have been combined with another active set. Thus, the scheduler forms a new combination of active sets. The new combination of active sets, however, may still include one or more bad active sets. Thus, the scheduler can continue to form new combinations of active sets until reaching a situation in which none of the existing active sets are considered bad active sets. Once the scheduler determines that all active sets in a combination of active sets are good active sets, the active set management scheme is complete and the scheduler has identified the combination of base station and UE groupings that can achieve high throughput, low latency, and/or high reliability while maintaining a reasonable network complexity.

After completion of the active set management scheme, the base station(s) that serve a particular UE in an active set can each transmit the same downlink data to the UE using one or more spatial beams. The UE can receive multiple streams via spatial processing techniques like minimum mean square error (MMSE). The UE can then combine the received data (e.g., by selecting the best spatial beam, by performing a soft combine, by performing a non-coherent combine, by performing a coherent combine, etc.) and perform any corresponding operations.

The techniques described herein can apply to the formation of active sets for downlink transmissions (e.g., transmission from base stations to UEs) and for uplink transmissions (e.g., transmissions from UEs to base stations). In some embodiments, the scheduler identifies a grouping of active sets for downlink transmissions (or uplink transmissions) and uses these groupings of active sets for uplink transmissions (or downlink transmissions) as well. Thus, the scheduler may execute the active set management scheme once for both downlink and uplink transmissions. In other embodiments, the scheduler executes the active set management scheme twice—once for downlink transmissions and once for uplink transmissions. Thus, the groupings of active sets for downlink transmissions may be the same or different as the groupings of active sets for uplink transmissions.

The scheduler can periodically execute the active set management scheme. For example, the scheduler can execute the active set management scheme at set intervals, when members of the MIMO network change (e.g., a UE joins the MIMO network, a UE leaves the MIMO network, a base station joins the MIMO network, a base station leaves the MIMO network, etc.), at the request of a base station and/or UE, and/or the like.

In alternate embodiments, the scheduler can form the initial active sets based on the spatial beams in the MIMO network rather than based on the base stations. Thus, the scheduler can initially group each spatial beam into a separate active set, and then combine active sets in a manner as described herein until each remaining active set is considered a good active set.

While the present disclosure is described herein such that the BBU (e.g., the scheduler) executes the active set management scheme and other related operations, this is not meant to be limiting. In other embodiments, the base stations may share data and collectively perform the active set management scheme and/or other related operations described herein as being performed by the BBU. In such embodiments, the BBU is optionally present.

The active set management scheme is described herein as being implemented within a CoMP network in which UEs non-coherently combine downlink data. The techniques described herein, however, can be applied to any type of MIMO network. Furthermore, the techniques described herein are not limited to MIMO networks in which UEs non-coherently combine downlink data. The UEs may combine downlink data in any suitable manner.

In an embodiment, the CoMP network is designed to operate at higher frequencies, such as at mmW frequencies. The techniques described herein can be applied to networks operating at any suitable range of frequencies. In addition, the techniques described herein can be used for a variety of use cases, such as media streaming, video chat, virtual reality, etc.

Figure 1B:
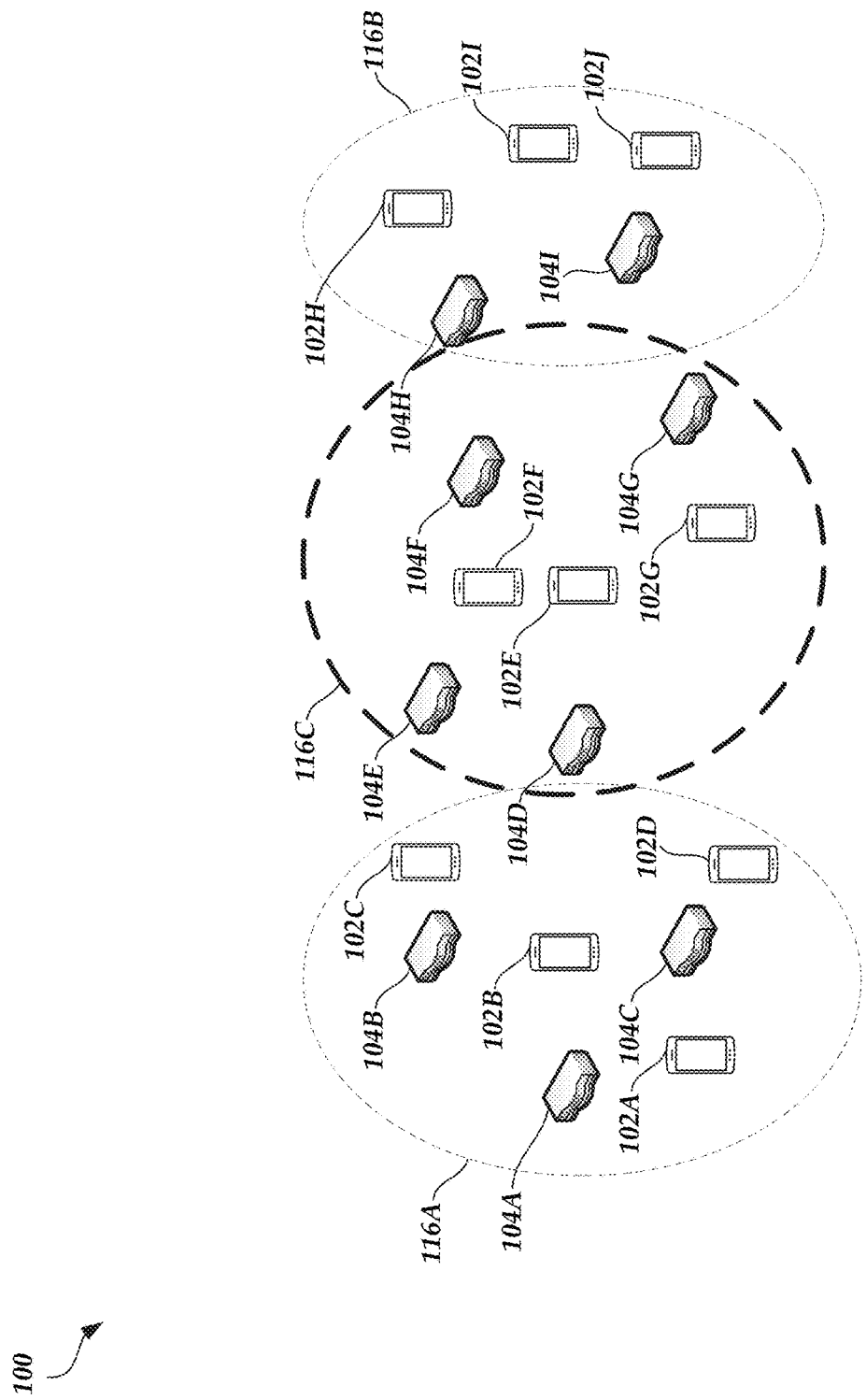

(e.g., if at least some of the spatial beam(s) in each UE's active set are spatially adjacent, such as spatially adjacent within a threshold angle, within a threshold distance, etc.).
Active Set Management in a MIMO Network FIGS. 1A-1B are diagrams illustrating a cooperative MIMO network environment 100 that includes UEs 102A-102J and nodes 104A-104I and the benefits provided by the active set management scheme according to an embodiment. The cooperative MIMO network can optionally function as a CoMP network in which UEs 102A-102J non-coherently combine downlink data. The nodes 104A-104I may communicate with each other via a wired and/or wireless connection. The nodes 104A-104I, directly or via a central processing system (e.g., a BBU comprising a scheduler), may further communicate with a core network (not shown) operated by a network service provider. The nodes 104A-104I may be configured to transmit data to and/or receive data from some or all of the UEs 102A-102J at mmW frequencies.

In a centralized radio access network (C-RAN) architecture, the central processing system (e.g., the BBU) may include a central unit (CU) that oversees a large area of deployment and one or more distributed units (DUs). The DUs may be logical or physical DUs. The CU may be coupled to one or more of the DUs, and each DU may be coupled to one or more RRUs outside the central processing system (e.g., the BBU). For example, each DU may couple to a virtual DU (VDU), and each VDU may couple to one or more RRUs. Two or more DUs may couple to the same VDU. In the context of active set management, the C-RAN architecture may be configured with these layers of logical and virtual DUs that are each associated with one or more RRUs so that joint processing between the RRUs is possible. Generally, the idea of active set management is to identify the right set of RRUs, regardless of the RRUs' physical DU connections, that should be chosen for joint processing.

In some embodiments, the nodes 104A-104I couple to the central processing system, not shown in FIGS. 1A-1B. In these embodiments, the nodes 104A-104I may each be referred to as an RRU or a serving node. The BBU may be physically coupled to the RRUs, such as a via an optical fiber connection. The BBU (e.g., the scheduler) may provide operational details to an RRU to control transmission and reception of signals from the RRU along with control data and payload data to transmit. The BBU (e.g., the scheduler) may also use link strength and/or other information provided by the UEs 102A-102J and/or nodes 104A-104I to form one or more active sets and/or to schedule data transmissions to and/or from the UEs 102A-102J. The RRU may provide data to the network (e.g., the BBU) received from UEs 102A-102J within a service area associated with the RRU.

Various standards and protocols may be included in the environment 100 to wirelessly communicate data between a base station (e.g., a node 104 and/or a BBU) and a wireless communication device (e.g., a UE 102). Some wireless devices may communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which may be known as WiMAX (Worldwide interoperability for Microwave Access), and the IEEE 802.11 standard, which may be known as Wi-Fi. In some systems, a radio access network (RAN) may include one or more base stations associated with one or more evolved NodeBs (also commonly denoted as enhanced NodeBs, eNodeBs, or eNBs), next generation NodeBs (gNBs), or any other suitable NodeBs (xNBs). In other embodiments, radio network controllers (RNCs) may be provided as the base stations. A base station provides a bridge between the wireless network and a core network such as the Internet. The base station may be included to facilitate exchange of data for the wireless communication devices of the wireless network.

The wireless communication device may be referred to a user equipment (UE). The UE may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things devices (IoT devices). A downlink (DL) transmission generally refers to a communication from a node to the wireless communication device, and an uplink (UL) transmission generally refers to a communication from the wireless communication device to the node.

A node 104 may include one or more antennas, and one or more of the antennas may serve as a TRP. A node 104 may include multiple antennas to provide multiple-input multiple-output (MIMO) communications. For example, a node 104 may be equipped with various numbers of transmit antennas (e.g., 1, 2, 4, 8, or more) that can be used simultaneously for transmission to one or more receivers, such as a UE 102. Receiving devices may include more than one receive antenna (e.g., 2, 4, etc.). The array of receive antennas may be configured to simultaneously receive transmissions from the node 104. Each antenna included in a node 104 may be individually configured to transmit and/or receive according to a specific time, frequency, power, and direction configuration. Similarly, each antenna included in a UE 102 may be individually configured to transmit or receive according to a specific time, frequency, power, and direction configuration. The configuration may be provided by the node 104 and/or the BBU. The direction configuration may be generated based on network estimate using channel reciprocity or determined based on feedback from UE 102 via selection of a beamforming codebook index, or a hybrid of the two.

Each node 104A-104J may support one or more digital basebands, the number of which may be less than or equal to the number of transmit antennas that the respective node 104A-104I has. Thus, assuming each node 104A-104I has $N_t$ transmit antennas supported by $N_d$ digital basebands, the maximum number of spatial beams that can be supported by the nodes 104A-104I is $N_t*9$ (e.g., the number of nodes 104), and the maximum number of independent streams that can be supported by the nodes 104A-104I is $N_d*9$ (e.g., the number of nodes 104). For simplicity and ease of explanation, the nodes 104A-104I illustrated in FIGS. 1A-1B each have 4 transmit antennas and 4 receive antennas. Thus, the maximum number of spatial beams that can be supported by the nodes 104A-104I is 36. The nodes 104A-104I can include the same number of receive antennas (e.g., used for UL transmissions) and transmit antennas (e.g., used for DL transmissions) or a different number of receive antennas and transmit antennas. In some embodiments, one or more antennas of a node 104A can both transmit DL signals and receive UL signals. The techniques described herein apply whether the nodes 104A-104I have the same or different number of antennas.

Similarly, the UEs 102A-102J can each include the same number of receive antennas (e.g., used for DL transmissions) and transmit antennas (e.g., used for UL transmissions) or a different number of receive antennas and transmit antennas. In some embodiments, one or more antennas of a UE 102 can both transmit UL signals and receive DL signals. Furthermore, the UEs 102A-102J and nodes 104A-104I can each include the same number of antennas for DL and/or UL transmissions. Alternatively, one or more of the UEs 102A-102J and/or one or more of the nodes 104A-104I can include a different number of antennas for DL and/or UL transmissions than other UEs 102A-102J and/or nodes 104A-104I (e.g., node 104A can include 3 transmit antennas and 3 receive antennas, UE 102A can include 4 receive antennas and 4 transmit antennas, node 104B can include 4 transmit antennas and 2 receive antennas, UE 102B can include 2 receive antennas and 3 transmit antennas, etc.). For simplicity and ease of explanation, the UEs 102A-102J illustrated in FIGS. 1A-1B each have 4 receive antennas and 4 transmit antennas. The techniques described herein apply whether the UEs 102A-102J have the same or different number of antennas.

FIG. 1A illustrates a situation in which a conventional BBU (e.g., a BBU that does not implement the active set management scheme described herein) forms active sets 106A-106B based on the physical proximity of RRUs. For example, the conventional BBU may form active sets based on which nodes 104 are physically close to each other (e.g., which nodes 104 belong to the same distributed unit (DU) or cluster). Here, the conventional BBU may determine that nodes 104A-104E are physically close and that nodes 104F-104I are physically close. Thus, the conventional BBU may from an active set 106A that includes nodes 104A-E and an active set 106B that includes nodes 104F-104I. UEs 102A-102D may be positioned within the geographic area covered by the active set 106A, and therefore may be served by the nodes 104A-104E. Similarly, UEs 102E-102J may be positioned within the geographic area covered by the active set 106B, and therefore may be served by the nodes 104F-104I.

However, the active sets 106A-106B formed by the conventional BBU based on node 104 proximity may have poor performance. In particular, UEs 102E and 102F are positioned close to the transmission boundary of the active set 106A. The transmission boundary (e.g., the dotted lines in FIG. 1A) represents the approximate distance over which signals transmitted by one or more of the nodes 104A-104E (and/or one or more of the UEs 102A-102D) of the active set 106A can be detected and/or processed. Thus, while UEs 102E and 102F are served by the nodes 104F-104I in the active set 106B, UEs 102E and 102F may nonetheless detect undesired signals transmitted by the nodes 104A-104E. As a result, the signals transmitted by the nodes 104A-104E and detected by the UEs 102E and 102F may interfere with desired signals transmitted by the nodes 104F-104I.

A BBU that executes the active set management scheme described herein, however, can form a group of active sets that avoids the interference issue. For example, FIG. 1B illustrates three active sets 116A-116C formed using the active set management scheme. As illustrated in FIG. 1B, the BBU that executes the active set management scheme combines the UEs 102E and 102F that previously suffered from interference issues into a separate active set 116C. In particular, the active sets 116A-116C are formed such that the UEs 102A-102J are less likely to be positioned on the boundaries of multiple active sets 116A-116C. For example, the active set 116A is different than the active set 106A in that the active set 116A does not include the nodes 104D-104E. Rather, the nodes 104D-104E are now grouped into active set 116C. Furthermore, the active set 116B is different than the active set 106B in that the active set 116B does not include the UEs 102E-102G or the nodes 104F-104G. Rather, the UEs 102E-102G and the nodes 104F-104G are now grouped into the active set 116C.

Figure 2A:
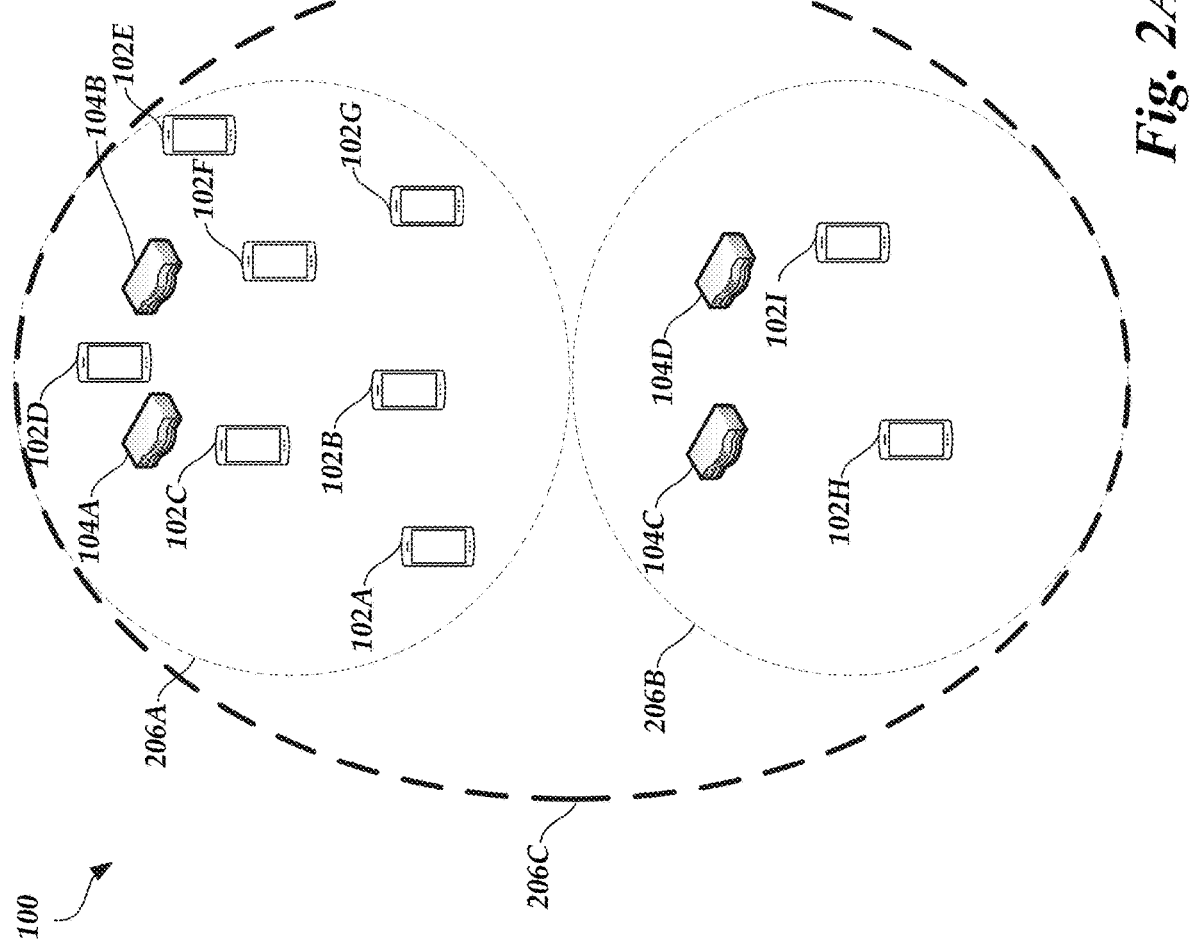
FIG. 2A is another diagram illustrating the cooperative MIMO network environment of FIGS. 1A-1B and the benefits provided by the active set management scheme according to an embodiment.

FIG. 2A is another diagram illustrating the cooperative MIMO network environment 100 and the benefits provided by the active set management scheme according to an embodiment. As illustrated in FIG. 2A, a conventional BBU once again forms active sets 206A-206B based on the physical proximity of RRUs. For example, the conventional BBU groups UEs 102A-102G and nodes 104A-104B into active set 206A and groups UEs 102H-102I and nodes 104C-104D into active set 206B based on node 104 physical proximity. Here, interference is not likely to be an issue because none of the UEs 102A-102I are positioned near an active set 206A-206B transmission boundary. However, this grouping of active sets has created a capacity issue. In particular, the number of MIMO transmit dimensions available in the active set 206A (e.g., the number of available spatial channels, the number of available distinct spatial beams, the number of transmission layers, the specific MIMO order, etc. provided by a combination of the node 104A and the node 104B, which may be 8 if each node 104A-104D includes 4 transmit antenna elements) is less than a minimum number required to serve the UEs 102A-102G in the active set 206A (e.g., 28 if each UE 102A-102I includes 4 receive antenna elements). As a result, the convention BBU and/or the nodes 104A-104B in the active set 206A may have to resort to orthogonal scheduling in time or frequency in order to serve all of the UEs 102A-102G. In other words, the nodes 104A-104B cannot serve all of the UEs 102A-102G within the same time period and/or using the same frequency band.

A BBU that executes the active set management scheme described herein, however, can form a group of active sets that avoids the capacity issue. For example, a BBU that executes the active set management scheme may form a single active set 206C that includes all of the UEs 102A-102I and all of the nodes 104A-104D. In this situation, the number of MIMO transmit dimensions available in the active set 206C may be at or greater than the minimum number required to serve the UEs 102A-102I in the active set 206C.

Figure 2B:
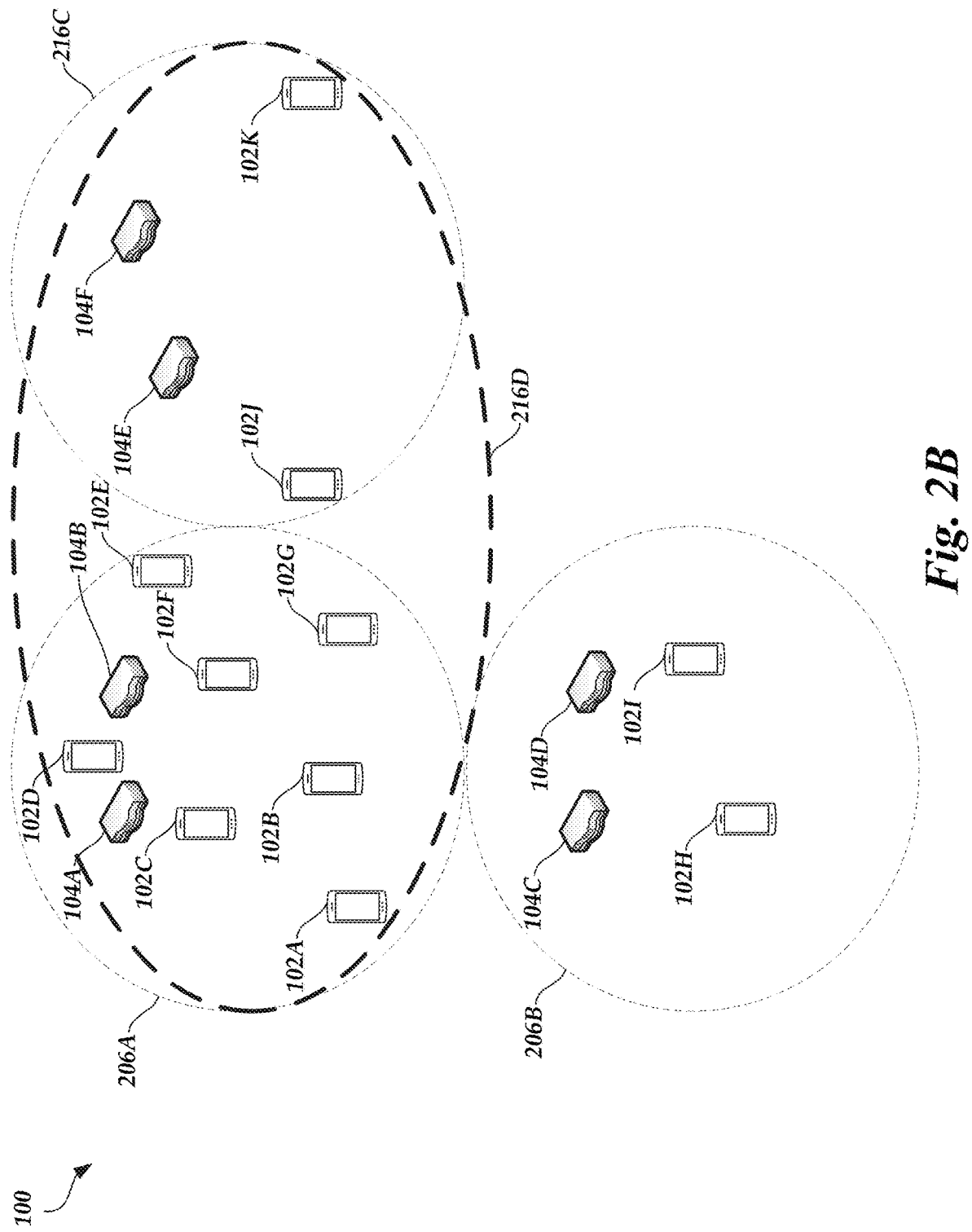
FIG. 2B is another diagram illustrating the cooperative MIMO network environment of FIGS. 1A-1B and the benefits provided by the active set management scheme according to an embodiment.

FIG. 2B is another diagram illustrating the cooperative MIMO network environment 100 and the benefits provided by the active set management scheme according to an embodiment. As illustrated in FIG. 2B, UEs 102J and 102K and nodes 104E and 104F have joined the other UEs 102A-102I and nodes 104A-104D previously present in the environment 100 illustrated in FIG. 2A. In this situation, the conventional BBU may form active sets 206A, 206B, and 216C based on the physical proximity of RRUs. Thus, the conventional BBU may group the new UEs 102J-102K and nodes 104E-104F into the active set 216C. As described above, the active set 206A may have a capacity issue. In addition, the active set 216C may have an interference issue given that the UE 102J is served by the active set 216C, but is close to the transmission boundary of the active set 206A.

A BBU that implements the active set management scheme described herein, however, can form a group of active sets that do not suffer from an interference or capacity issue. For example, a BBU that executes the active set management scheme may form two active sets—active set 206B and active set 216D. As illustrated in FIG. 2A, the BBU combined active set 206A and active set 206B to form active set 206C when new UEs 102J-102K and nodes 104E-104F were not present. However, the BBU may not combine active sets 206A and 206B to form a group of active sets 206C and 216C in this situation because doing so would still result in active set 216 suffering from an interference issue. Instead, the BBU can combine active set 206A and 216C to form the active set 216D. This combination not only alleviates the interference issue now that the UE 102J is in the same active set as the nodes 104A-104B that caused the interference issue, but this combination also alleviates the capacity issue originally present in active set 206A because the number of MIMO transmit dimensions available in the active set 216D may be at or greater than the minimum number required to serve the UEs 102A-102G and 102J-102K in the active set 216D.

Figure 3A:
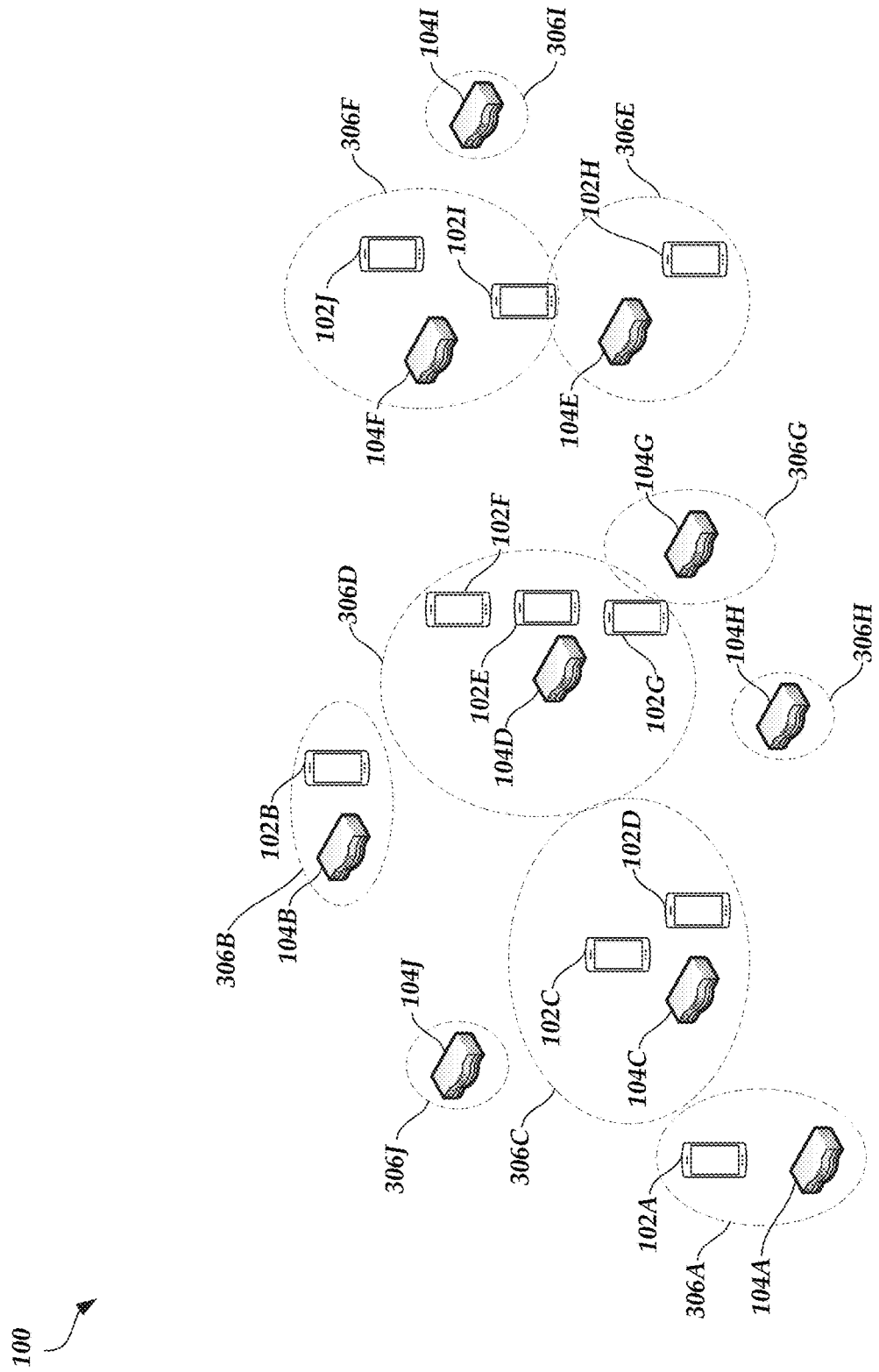
FIGS. 3A-3C are diagrams illustrating the iterative combining or merging of active sets in accordance with execution of the active set management scheme described herein.
Figure 3B:
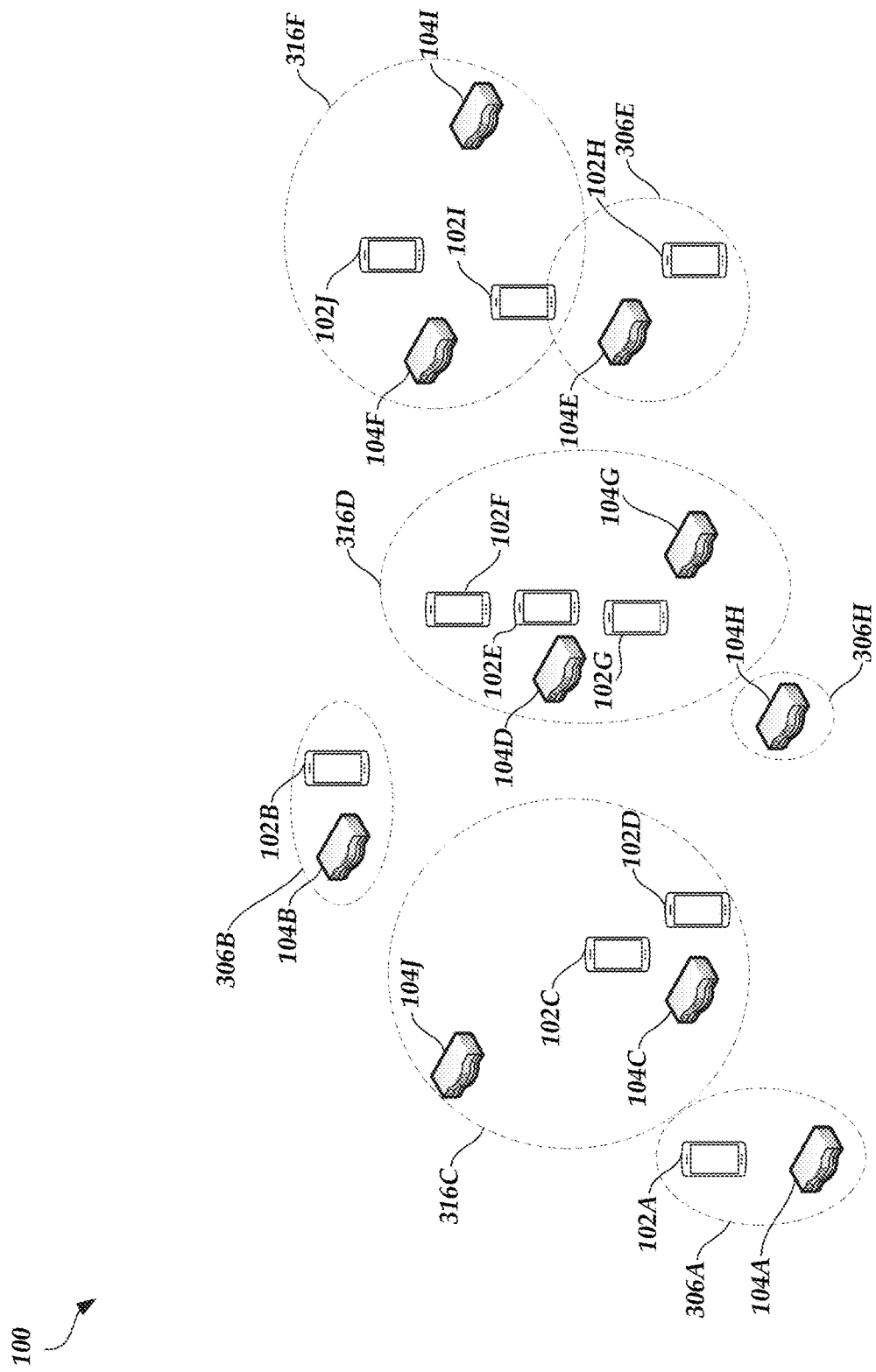
Figure 3C:
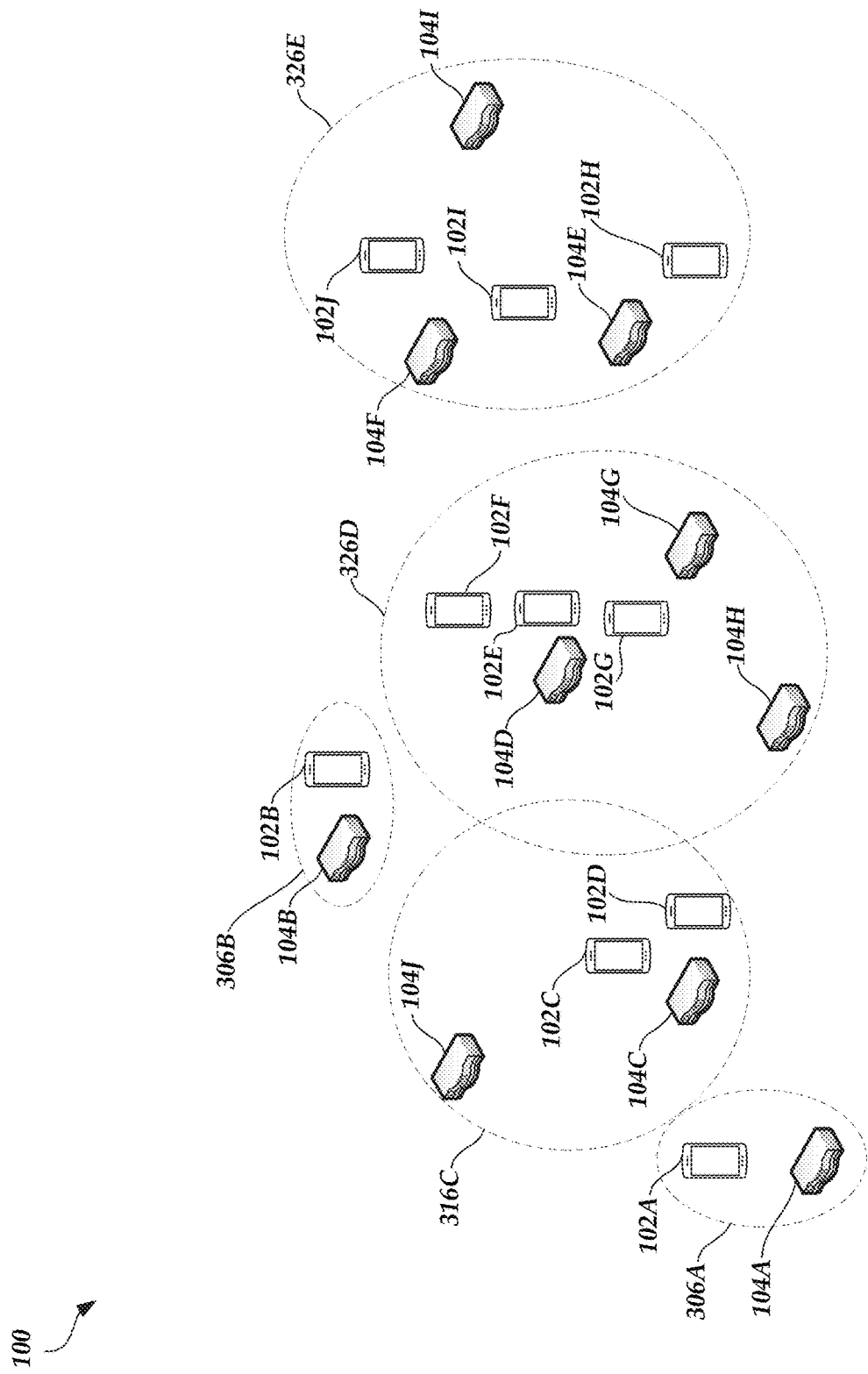

FIGS. 3A-3C are diagrams illustrating the iterative combining or merging of active sets in accordance with execution of the active set management scheme described herein. For example, the BBU can implement the active set management scheme by executing a set of iterative operations. As illustrated in FIG. 3A, the BBU can initially group each node 104A-104J into a separate active set 306A-306J. Each node 104A-104J may serve zero or more UEs 102A-102J. As an illustrative example, the BBU may select the node 104A to serve the UE 102A within the active set 306A, may select the node 104B to serve the UE 102B within the active set 306B, may select the node 104C to serve the UEs 102C-102D with the active set 306C, may select the node 104D to serve the UEs 102E-102G within the active set 306D, may select the node 104E to serve the UE 102H within the active set 306E, may select the node 104F to serve the UEs 102I-102J within the active set 306F, may not select the node 104G to serve any UE 102 within the active set 306G, may not select the node 104H to serve any UE 102 within the active set 306H, may not select the node 104I to serve any UE 102 within the active set 306I, and may not select the node 104J to serve any UE 102 within the active set 306J. Alternatively, not shown, the BBU can initially group multiple nodes 104A-104I into a single active set and form one or more active sets.

The BBU can select the UE(s) 102A-102J that each node 104A-104J serves during a training mode. For example, in the training mode, the nodes 104A-104J may transmit signals (e.g., synchronization signal block (SSB) signals), also referred to herein as beam pilots, for reception by the UEs 102A-102J in a sequential manner. In particular, node 104A may transmit a signal across a first spatial beam (e.g., $A_1$) using one or more node 104A transmit antennas, then transmit a signal across a second spatial beam (e.g., $A_2$) using one or more node 104A transmit antennas, and so on. After node 104A has transmitted a signal across the four spatial beams served by the node 104A (e.g., $A_1$, $A_2$, $A_3$, and $A_4$), node 104B can begin transmitting a signal across a first spatial beam (e.g., $B_1$) using one or more node 104B transmit antennas, then transmit a signal across a second spatial beam (e.g., $B_2$) using one or more node 104B transmit antennas, and so on. In total, each node 104A-104J may transmit, in sequence, one or more signals across each of the spatial beams served by the respective node 104A-104J (e.g., $A_1$, $A_2$, $A_3$, $A_4$, $B_1$, $B_2$, $B_3$, $B_4$, $C_1$, $C_2$, $C_3$, $C_4$, $D_1$, $D_2$, $D_3$, $D_4$, $E_1$, $E_2$, $E_3$, $E_4$, $F_1$, $F_2$, $F_3$, $F_4$, $G_1$, $G_2$, $G_3$, $G_4$, $H_1$, $H_2$, $H_3$, $H_4$, $I_1$, $I_2$, $I_3$, $I_4$, $J_1$, $J_2$, $J_3$, and $J_4$). The above example is provided merely for explanatory purposes, as the nodes 104A-104J can transmit the signals in any order (e.g., node 104B can transmit signals before node 104A, node 104B can transmit a signal across a first spatial beam using one or more node 104B transmit antennas after the node 104A transmits a signal across a first spatial beam using one or more node 104A transmit antennas and before the node 104A transmits a signal across a second spatial beam using one or more node 104A transmit antennas, etc.). The signals transmitted by each node 104A-104J may include the same physical cell ID (PCI), and therefore the signals may appear to the UEs 102A-102J as if the signals are originating from the same node or base station.

As an illustrative example, the node 104A can transmit signals across four spatial beams (e.g., $A_1$, $A_2$, $A_3$, and $A_4$), the node 104B can transmit signals across four spatial beams (e.g., $B_1$, $B_2$, $B_3$, and $B_4$), the node 104C can transmit signals across four spatial beams (e.g., $C_1$, $C_2$, $C_3$, and $C_4$), the node 104D can transmit signals across four spatial beams (e.g., $D_1$, $D_2$, $D_3$, and $D_4$), and so on. The spatial beams may be positioned in different directions to provide a larger network coverage area.

The UEs 102A-102J can receive or detect a signal transmitted across a spatial beam and determine a link strength (e.g., a signal-to-interference-plus-noise ratio (SINR)) of the spatial beam using the received or detected signal. The UEs 102A-102J can repeat this process for some or all of the spatial beams collectively served by the nodes 104A-104J. Each UE 102A-102J can then provide an indication of the link strength of a spatial beam to one or more of the nodes 104A-104J via a control signaling channel and/or via in-band signaling (e.g., using the spatial channel over which data will be transmitted to and/or from the UEs 102A-102J). The UEs 102A-102J may provide the indication of the link strength for each spatial beam in the same transmission or in separate transmissions (e.g., where each transmission corresponds to a particular spatial beam). For example, if transmitting the indication of the link strength via in-band signaling, the UEs 102A-102J may aggregate link strength data (e.g., aggregate the link strength determined for a plurality of spatial beams) and send the aggregated link strength data via a single or a small number of transmissions. For example, the UEs 102A-102J can transmit a link strength vector, where each element of the vector includes an indication of the link strength of a particular spatial beam.

Alternatively or in addition, the UEs 102A-102J may each determine a spatial beam with the best link strength (e.g., highest link strength). The UEs 102A-102J may then transmit an indication of the spatial beam with the best link strength to the nodes 104A-104J, with or without also providing an indication of the link strengths of the other spatial beams.

The nodes 104A-104J can forward the link strength data to the BBU. The BBU can then select one or more spatial beams for serving data to the UEs 102A-102J. For example, in addition to providing the spatial beam link strengths, the UEs 102A-102J may also provide an indication of a link quality and/or channel condition of each spatial beam, and the nodes 104A-104J can forward this information to the BBU. The BBU may also have information indicating the physical layout of the transmit antennas of the nodes 104A-104J and/or the direction in which such transmit antennas transmit, and the spatial beams that are used to serve other UEs 102A-102J. The nodes BBU may use the link strengths, the link qualities, the transmit antenna physical layout and/or directional information, and/or information indicating which spatial beams serve other UEs 102A-102J to select one or more spatial beams for each UE 102A-102J. As an illustrative example, the BBU may determine that a spatial beam could serve a UE 102A-102J if the link strength of the spatial beam provided by the UE 102A-102J is greater than a threshold value and/or if there is minimal overlap with spatial beams selected to serve other UEs 102A-102J (e.g., the interference with other spatial beams that would result from serving the UE 102A-102J using the spatial beam under consideration is less than a threshold value, if the spatial beam under consideration is not spatially adjacent to another spatial beam used to serve another UE 102A-102J, such as not spatially adjacent within a threshold angle, within a threshold distance, etc.).

To increase redundancy, and therefore reliability, the BBU can select multiple spatial beams from one or more nodes 104A-104J to a serve a UE 102A-102J. Each spatial beam may be used to transmit the same DL data to the UE 102A-102J, and therefore having multiple spatial beams serving a UE 102A-102J may ensure that the UE 102A-102J receives the transmitted data even if other transmissions interfere with one or more spatial beams. The BBU and/or nodes 104A-104J may be able to sacrifice some capacity in favor of redundancy because, for example, the capacity per link may be relatively high given the high bandwidth and signal-to-noise ratio (SNR) at mmW frequencies. In fact, sacrificing some capacity in favor of redundancy may be desirable given that transmissions at mmW frequencies may typically be unreliable due to relatively high propagation losses at these frequencies.

Once spatial beam(s) are selected for each UE 102A-102J, the BBU can group each UE 102A-102J into the active set 306A-306J that serves the spatial beam(s) selected for the respective UE 102A-102J. Each active set 306A-306J may identify each node 104A-104J and spatial beam pair selected to serve a particular UE 102A-102J. The spatial beam(s) serving a UE 102A-102J may be considered the active set of the UE 102A-102J. As an illustrative example, the active set may be in the following format: {(node name, spatial beam), (node name, spatial beam), (node name, spatial beam), . . . }.

Once the initial group of active sets 306A-306J is formed, the BBU can analyze each active set 306A-306J to determine whether the respective active set 306A-306J is a good active set or a bad active set. An active set 306A-306J may be considered a bad active set if the number of available MIMO dimensions in the active set 306A-306J is below a first threshold value or if a level of interference in the active set 306A-306J is at or above a second threshold value. An active set 306A-306J is considered a good active set if the number of available MIMO dimensions in the active set 306A-306J is at or above the first threshold value and if the level of interference in the active set 306A-306J is below the second threshold value.

As described above, the number of available MIMO dimensions in an active set 306A-306J may be equivalent to the number of available spatial channels in the active set 306A-306J, the number of available distinct spatial beams served within the active set 306A-306J, the number of transmission layers in the active set 306A-306J, based on the specific MIMO order of the active set 306A-306J, the precoding space cardinality of the active set 306A-306J, based on the MIMO rank of the active set 306A-306J, the number of linearly independent dimensions that the active set 306A-306J can provide, and/or the like. If all possible MIMO dimensions are available, the maximum number of available MIMO dimensions for DL transmissions may be a product of the number of nodes 104 in the active set 306A-306J and a number of transmit antennas included in each node 104 in the active set 306A-306J, and the maximum number of available MIMO dimensions for UL transmissions may be a product of the number of nodes 104 in the active set 306A-306J and a number of receive antennas included in each node 104 in the active set 306A-306J. All possible MIMO dimensions may or may not be available.

The first threshold value may be based on a minimum number of MIMO dimensions needed to properly serve UE(s) 102A-102J in an active set 306A-306J. For example, the first threshold value may be $\gamma * U_j * N_r$, where $\gamma$ is a constant greater than or equal to 1 (e.g., 1, 1.25, 1.5, 1.75, 2, etc.), $U_j$ is the number of UEs 102A-102J in active set j, and $N_r$ is the number of receive antennas included in each UE 102A-102J in the active set j for DL transmissions or the number of transmit antennas included in each UE 102A-102J in the active set j for UL transmissions. Thus, the minimum number of MIMO dimensions needed to properly serve UE(s) 102A-102J in an active set 306A-306J may be greater than the total number of receive antennas (or transmit antennas) provided by the UE(s) 102A-102J in the active set 306A-306J because the constant $\gamma$ may be greater than 1. If the UEs 102A-102J and the nodes 104A-104J have the same number of antennas, then more transmit antennas than receive antennas (in the DL situation) would be needed to meet the minimum number of MIMO dimensions needed to properly serve UE(s) 102A-102J in an active set 306A-306J. Generally, it may be beneficial to have more transmit antennas than receive antennas (in the DL situation) in an active set 306A-306J because the characteristics of the spatial channel may not be perfectly known. Any unknown or underestimated noise or interference issues could cause capacity issues if the number of transmit antennas and the number of receive antennas (in the DL situation) in an active set 306A-306J is equal. Similarly, it may be beneficial to have more receive antennas than transmit antennas (in the DL situation) in an active set 306A-306J.

In other embodiments, some or all of the UEs 102A-102J may use some MIMO receive dimensions to perform interference nulling or other operations to improve performance. In such a situation, the first threshold value may be altered to be $\gamma * U_j * N_r'$, where $\gamma$ is a constant greater than or equal to 1 (e.g., 1, 1.25, 1.5, 1.75, 2, etc.), $U_j$ is the number of UEs 102A-102J in active set j, and $N_r'$ is a number of receive antennas included in each UE 102A-102J in the active set j available for DL transmissions or the number of transmit antennas included in each UE 102A-102J in the active set j available for UL transmissions. Generally, $N_r'$ is less than $N_r$, and the difference between $N_r$ and $N_r'$ is the number of MIMO receive dimensions used to perform interference nulling or other operations. Thus, an active set 306A-306J may be more likely to have a sufficient number of available MIMO dimensions to properly serve the UEs 102A-102J associated with the active set 306A-306J.

The BBU may determine the level of interference in an active set 306A-306J by computing a signal-to-leakage ratio (SLR). For example, the SLR may be the power or energy of a signal transmitted between a UE 102A-102J and a node 104A-104J in an active set 306A-306J over the power or energy of one or more signals transmitted by node(s) 104A-104J (and/or UE(s) 102A-102J) in another active set 306A-306J that are detected by a UE 102A-102J and/or node 104A-104J in the subject active set 306A-306J. As an illustrative example, the SLR for active set 306A may be the power or energy of a signal transmitted between the UE 102A and the node 104A over the power or energy of one or more signals transmitted by node(s) 104B-104J and/or UE(s) 102B-102J that are detected by the UE 102A and/or the node 104A. As another example, the SLR may be the power or energy of a signal transmitted between a UE 102A-102J and a node 104A-104J in an active set 306A-306J over a leakage of this signal to one or more UEs 102A-102J outside of (e.g., not served by) or one or more nodes 104A-104J not part of the active set 306A-306J. As an illustrative example, the SLR for the active set 306A may be the power or energy of a signal transmitted from the node 104A to the UE 102A over the leakage of the signal to one or more UEs 102B-102J not served by the active set 306A. The second threshold value may therefore be a threshold SLR value that represents an unacceptable level of interference.

If the BBU determines that all of the active sets 306A-306J are good active sets, then the active set management scheme is complete. Thus, the BBU identifies that the combination of node 104 and UE 102 groupings that minimizes interference and capacity issues is the combination of groupings represented by active sets 306A-306J. The BBU can then begin scheduling DL and/or UL transmissions between the UEs 102A-102J and nodes 104A-104J in accordance with the active sets 306A-306J.

However, if the BBU determines that one or more active sets 306A-306J is a bad active set, then the BBU can determine, for each bad active set, one or more metrics. The number of metrics determined by the BBU can be equal to the number of active sets 306A-306J other than the bad active set that exist, and each metric may be associated with the bad active set and one of the existing active sets 306A-306J other than the bad active set. Generally, a metric may be a representation of a capacity and signal strength level that would result if the bad active set was combined with the other existing active set 306A-306J associated with the metric.

As an illustrative example, the BBU may determine that of the initial active sets 306A-306J, active sets 306C, 306D, and 306F are bad active sets. For example, active set 306C may be a bad active set because the number of available MIMO dimensions is less than the first threshold value (e.g., the active set 306C lacks sufficient capacity to serve the UEs 102C and 102D), active set 306D may be a bad active set because the number of available MIMO dimensions is less than the first threshold value (e.g., the active set 306D lacks sufficient capacity to serve the UEs 102E-102G) and because the level of interference is greater than the second threshold value (e.g., the UE 102G experiences a high level of interference because the UE 102G is positioned near a transmission boundary of active set 306G), and active set 306F may be a bad active set because the number of available MIMO dimensions is less than the first threshold value (e.g., the active set 306F lacks sufficient capacity to serve the UEs 102I-102J) and because the level of interference is greater than the second threshold value (e.g., the UE 102I experiences a high level of interference because the UE 102I is positioned near a transmission boundary of active set 306E).

The BBU may determine 9 metrics for the active set 306C, 9 metrics for the active set 306D, and 9 metrics for the active set 306F. For example, the BBU may determine a metric (e.g., $m_{XY}$) for the following pairs of active sets 306A-306J: active sets 306C and 306A (e.g., $m_{CA}$), active sets 306C and 306B (e.g., $m_{CB}$), active sets 306C and 306D (e.g., $m_{CD}$), active sets 306C and 306E (e.g., $m_{CE}$), active sets 306C and 306F (e.g., $m_{CF}$), active sets 306C and 306G (e.g., $m_{CG}$), active sets 306C and 306H (e.g., $m_{CH}$), active sets 306C and 306I (e.g., $m_{CI}$), active sets 306C and 306J (e.g., $m_{CJ}$), active sets 306D and 306A (e.g., $m_{DA}$), active sets 306D and 306B (e.g., $m_{DB}$), active sets 306D and 306C (e.g., $m_{DC}$), active sets 306D and 306E (e.g., $m_{DE}$), active sets 306D and 306F (e.g., $m_{DF}$), active sets 306D and 306G (e.g., $m_{DG}$), active sets 306D and 306H (e.g., $m_{DH}$), active sets 306D and 306I (e.g., $m_{DI}$), active sets 306D and 306J (e.g., $m_{DJ}$), active sets 306F and 306A (e.g., $m_{FA}$), active sets 306F and 306B (e.g., $m_{FB}$), active sets 306F and 306C (e.g., $m_{FC}$), active sets 306F and 306D (e.g., $m_{FD}$), active sets 306F and 306E (e.g., $m_{FE}$), active sets 306F and 306G (e.g., $m_{FG}$), active sets 306F and 306H (e.g., $m_{FH}$), active sets 306F and 306I (e.g., $m_{FI}$), and active sets 306F and 306J (e.g., $m_{FJ}$). When multiple active sets 306A-306J are bad active sets, some metrics may be duplicates (e.g., $m_{CD}$ and $m_{DC}$, $m_{CF}$ and $m_{FC}$, and $m_{DF}$ and $m_{FD}$) and thus the BBU can compute the duplicate metrics once.

The BBU can compute each metric using a first formulation or a second formulation. For example, the BBU can compute a metric $m_{ij}$ associated with an active set i and an active set j using the first formulation as follows:

$$m_{ij} = \rho_{ij}\left(\sum_n \log_2(\beta_n^{(j)}) + \sum_m \log_2(\beta_m^{(i)})\right)$$

where $\beta_n^{(j)}$ is the SNR of one or more signals transmitted between UE n in active set i and one or more nodes 104 in active set j, and $\beta_m^{(i)}$ is the SNR of one or more signals transmitted between UE m in active set j and one or more nodes 104 in active set i. Thus, $\beta_n^{(j)}$ and $\beta_m^{(i)}$ represent an SNR between a UE 102 of a first active set and one or more nodes 104 of a second active set, and a summation of these SNRs provides an indication of the signal strength or link quality that may result if the first and second active sets are combined. Thus, the metric $m_{ij}$ can be a function of long-term SNR (e.g., a function of the pathloss as captured by reference signal receive power (RSRP)). In addition, $\rho_{ij}$ is defined for DL transmissions as follows:

$$\rho_{ij} = \begin{cases} (N_tB_iB_j - N_rU_iU_j) & N_tB_iB_j \geq N_rU_iU_j \\ \dfrac{-1}{N_tB_iB_j - N_rU_iU_j} & N_tB_iB_j < N_rU_iU_j \end{cases}$$

where $N_t$ is the number of transmit antennas provided by each node 104 in active set i and the active set j, $B_i$ is the number of nodes 104 in the active set i, $B_j$ is the number of nodes 104 in the active set j, $N_r$ is the number of receive antennas provided by each UE 102 in active set i and active set j, $U_i$ is the number of UEs 102 in the active set i, and $U_j$ is the number of UEs 102 in the active set j. Thus, $\rho_{ij}$ generally represents a capacity of a combined active set formed from combining or merging active sets i and j, and specifically the relative number of MIMO dimensions added or lost when combining or merging active sets i and j. The $\rho_{ij}$ constant is a value that is based on a total number of MIMO dimensions that would be available if the active set i and the active set j are combined. In particular, $\rho_{ij}$ is a difference between the total number of transmit streams (e.g., MIMO transmit dimensions) available as a result of a combination of active sets i and j and the total number of receive streams (e.g., MIMO receive dimensions) available as a result of a combination of active sets i and j if the total number of transmit streams is greater than or equal to the total number of receive streams. In other words, $\rho_{ij}$ is a difference between the combined or total number of MIMO transmit dimensions available in the combined active set formed from a combination of active sets i and j and the combined minimum number of dimensions needed by the combined active set to serve the UEs 102 that would be associated with the combined active set. The total number of transmit streams may be a minimum of a number of transmit antenna elements available as a result of a combination of active sets i and j and a number of available transmission RF chains as a result of a combination of active sets i and j.

Otherwise, if the total number of transmit streams is less than the total number of receive streams, then $\rho_{ij}$ is an inverse of a difference between the total number of transmit streams available as a result of a combination of active sets i and j and the total number of receive streams available as a result of a combination of active sets i and j. The $\rho_{ij}$ constant may be an inverse of the difference when the total number of transmit streams is less than the total number of receive streams because a combined active set formed from active set i and active set j may lack sufficient capacity in this situation (e.g., given that the minimum number of MIMO dimensions needed to serve the UEs 102 of the combined active set is not met), and causing the constant to become a smaller value by taking the inverse may ensure that the resulting metric $m_{ij}$ is not the highest metric of all the metrics computed for the bad active set (e.g., active set i). As explained below, if the resulting metric $m_{ij}$ is not the highest metric of all the metrics computed for the bad active set, the BBU will not combine the bad active set i with the active set j to form another bad active set.

Similarly, $\rho_{ij}$ is defined for UL transmissions as follows:

$$\rho_{ij} = \begin{cases} (N_rB_iB_j - N_tU_iU_j) & N_rB_iB_j \geq N_tU_iU_j \\ \dfrac{-1}{N_rB_iB_j - N_tU_iU_j} & N_rB_iB_j < N_tU_iU_j \end{cases}$$

where $N_r$ is the number of receive antennas provided by each node 104 in active set i and the active set j, $B_i$ is the number of nodes 104 in the active set i, $B_j$ is the number of nodes 104 in the active set j, $N_t$ is the number of transmit antennas provided by each UE 102 in active set i and active set j, $U_i$ is the number of UEs 102 in the active set i, and $U_j$ is the number of UEs 102 in the active set j. Thus, $\rho_{ij}$ generally represents a capacity of a combined active set formed from combining or merging active sets i and j, and specifically the relative number of MIMO dimensions added or lost when combining or merging active sets i and j. The $\rho_{ij}$ constant is a value that is based on a total number of MIMO dimensions that would be available if the active set i and the active set j are combined. In particular, $\rho_{ij}$ is a difference between the total number of receive streams (e.g., MIMO receive dimensions) available as a result of a combination of active sets i and j and a minimum of the total number of transmit streams (e.g., MIMO transmit dimensions) available as a result of a combination of active sets i and j and a number of receiver RF chains at the nodes 104 in the combination of active sets i and j if the total number of receive streams is greater than or equal to the total number of transmit streams. In other words, $\rho_{ij}$ is a difference between the combined or total number of MIMO receive dimensions available in the combined active set formed from a combination of active sets i and j and the combined minimum number of dimensions needed by the combined active set to serve the UEs 102 that would be associated with the combined active set.

Otherwise, if the total number of receive streams is less than the total number of transmit streams, then $\rho_{ij}$ is an inverse of a difference between the total number of receive streams available as a result of a combination of active sets i and j and the total number of transmit streams available as a result of a combination of active sets i and j. The $\rho_{ij}$ constant may be an inverse of the difference when the total number of receive streams is less than the total number of transmit streams because a combined active set formed from active set i and active set j may lack sufficient capacity in this situation (e.g., given that the minimum number of MIMO dimensions needed to serve the UEs 102 of the combined active set is not met), and causing the constant to become a smaller value by taking the inverse may ensure that the resulting metric $m_{ij}$ is not the highest metric of all the metrics computed for the bad active set (e.g., active set i). As explained below, if the resulting metric $m_{ij}$ is not the highest metric of all the metrics computed for the bad active set, the BBU will not combine the bad active set i with the active set j to form another bad active set.

Accordingly, the metric $m_{ij}$ may be a value that generally represents a capacity and link quality (or signal strength) that would result if active sets i and j are combined. As described below, the BBU may use the metrics (and therefore a representation of capacity and link quality) to combine or not combine active sets. As described above, this is unlike conventional BBUs, which may rely on the physical proximity of RRUs (which may be determined based on link quality) to form active sets.

As another example, the BBU can compute a metric $m_{ij}$ associated with an active set i and an active set j using the second formulation. The second formulation can use SLR instead of SNR, such as follows:

$$m_{ij} = \rho_{ij} \left( \frac{\Sigma_{n \in B_j} \beta_n^{(j)}}{1 + \Sigma_{n\ not\ in\ B_j} \beta_n^{(j)}} + \frac{\Sigma_{m \in B_i} \beta_m^{(i)}}{1 + \Sigma_{m\ not\ in\ B_i} \beta_m^{(i)}} \right)$$

where $n \in \beta_j$ references UE n in active set i that detects signals from the nodes 104 in active set j, n not in $\beta_j$ references UE n in active set i that detects signals from nodes 104 that are not in active set j, $m \in \beta_i$ references UE m in active set j that detects signals from the nodes 104 in active set i, and m not in $\beta_i$ references UE m in active set j that detects signals from nodes 104 that are not in active set i. Thus, $\Sigma_{n \in B_j} \beta_n^{(j)}$ references a summation of the SNRs of signals between UEs n in active set i and nodes 104 in active set j, $\Sigma_{n\ not\ in\ B_j} \beta_n^{(j)}$ references a summation of the SNRs of signals between UEs n in active set i and nodes 104 that are not in active set j, $\Sigma_{m \in B_i} \beta_m^{(i)}$ references a summation of the SNRs of signals between UEs m in active set j and nodes 104 in active set i, and $\Sigma_{m\ not\ in\ B_i} \beta_m^{(i)}$ references a summation of the SNRs of signals between UEs m in active set j and nodes 104 that are not in active set i. The summation of SNRs referenced by $\Sigma_{n \in B_j} \beta_n^{(j)}$ and the summation of SNRs referenced by $\Sigma_{m \in B_i} \beta_m^{(i)}$ may correspond to a summation of SNRs of desirable signals, whereas the summation of SNRs referenced by $\Sigma_{n\ not\ in\ B_j} \beta_n^{(j)}$ and the summation of SNRs referenced by $\Sigma_{m\ not\ in\ B_i} \beta_m^{(i)}$ may correspond to a summation of SNRs of undesirable signals (e.g., leakage or interference signals). Thus, a ratio of $\Sigma_{n \in B_j} \beta_n^{(j)}$ over $1 + \Sigma_{n\ not\ in\ B_j} \beta_n^{(j)}$ may represent an SLR value of active set i, a ratio of $\Sigma_{m \in B_i} \beta_m^{(i)}$ over $1 + \Sigma_{m\ not\ in\ B_i} \beta_m^{(i)}$ may represent an SLR value of active set j, and a summation of the two ratios may represent an SLR value of a combined active set formed from a combination or merging of active sets i and j. In downlink examples, the SLR value of a combined active set may be the power or energy of a signal from one or more of the nodes in the combined active set to one or more of the UEs in the combined active set over the leakage of this signal to one or more UEs outside the combined active set (e.g., UEs not served by the combined active set). In uplink examples, the SLR value of a combined active set may be the power or energy of a signal from one or more of the UEs in the combined active to one or more of the nodes in the combined active set over the leakage of this signal to one or more nodes outside the combined active set (e.g., nodes that do not serve UEs in the combined active set).

Once the metrics are computed, the BBU can determine, for each bad active set, a highest metric associated with the bad active set. To eventually remove bad active sets from the MIMO network, the BBU may combine each bad active set with another existing active set 306A-306J in an attempt to form a combined active set that would be considered a good active set. The BBU can combine a bad active set with a good active set or another bad active set. The highest metric may indicate which active set 306A-306J that the BBU should combine with the bad active set. As explained below, combining a bad active set with another existing active set 306A-306J based on the determined metrics may not necessarily immediately lead to a combined active set that is a good active set. However, the process of combining bad active sets with another existing active set 306A-306J will eventually lead to a situation in which no bad active sets remain.

For example, the BBU can combine a bad active set with another existing active set 306A-306J that is associated with the highest metric associated with the bad active set. In the example illustrated above, the BBU may determine that the highest metric for the bad active set 306C is the metric associated with active set 306J (e.g., $m_{CJ}$), the highest metric for the bad active set 306D is the metric associated with active set 306G, and the highest metric for the bad active set 306F is the metric associated with active set 306I. Thus, the BBU may combine active sets 306C and 306J to form new active set 316C, combine active sets 306D and 306G to form new active set 316D, and combine active sets 306F and 306I to form new active set 316F, as illustrated in FIG. 3B.

Alternatively, the BBU can determine, for each bad active set, a second highest metric (or a third highest metric, a fourth highest metric, etc.) associated with the bad active set and combine the bad active set with another existing active set 306A-306J that is associated with the second highest metric (or the third highest metric, the fourth highest metric, etc.) associated with the bad active set. As an illustrative example, the BBU may determine that the highest metric for the bad active set 306C is the metric associated with active set 306J, and the second highest metric for the bad active set 306C is the metric associated with active set 306H. The BBU may then combine active sets 306C and 306H.

After combining each bad active set with another existing active set 306A-306J, the BBU can once again determine whether the remaining active sets 306A-306B, 316C-316D, 306E, 316F, and 306H are good active sets or bad active sets. If the BBU determines that all of the remaining active sets 306A-306B, 316C-316D, 306E, 316F, and 306H are good active sets, then the active set management scheme is complete. Thus, the BBU identifies that the combination of node 104 and UE 102 groupings that minimizes interference and capacity issues is the combination of groupings represented by active sets 306A-306B, 316C-316D, 306E, 316F, and 306H. The BBU can then begin scheduling DL and/or UL transmissions between the UEs 102A-102J and nodes 104A-104J in accordance with the active sets 306A-306B, 316C-316D, 306E, 316F, and 306H.

Here, however, the BBU determines that one or more active sets 306A-306B, 316C-316D, 306E, 316F, and 306H is a bad active set. In particular, the BBU determines that new active set 316D is a bad active set for capacity issues (e.g., for DL transmissions, the number of available MIMO receive dimensions outnumbers the number of available MIMO transmit dimensions, and/or for UL transmissions, the number of available MIMO transmit dimensions outnumbers the number of available MIMO receive dimensions), and new active set 316F is a bad active set for interference issues (e.g., the UE 102I is positioned near a transmission boundary of a neighboring active set 306E and therefore may experience high interference levels). Accordingly, the BBU can determine metrics for the new active sets 316D and 316F as described above.

The BBU may determine that the highest metric for the bad active set 316D is the metric associated with the active set 306H, and the highest metric for the bad active set 316F is the metric associated with the active set 306E. Thus, the BBU can combine active sets 316D and 306H to form new active set 326D, and can combine active sets 316F and 306E to form new active set 326E, as illustrated in FIG. 3C.

After combining each bad active set with another existing active set 306A-306B, 316C-316D, 306E, 316F, and 306H, the BBU can once again determine whether the remaining active sets 306A-306B, 316C, 326D, and 326E are good active sets or bad active sets. If the BBU determines that all of the remaining active sets 306A-306B, 316C, 326D, and 326E are good active sets, then the active set management scheme is complete. Thus, the BBU identifies that the combination of node 104 and UE 102 groupings that minimizes interference and capacity issues is the combination of groupings represented by active sets 306A-306B, 316C, 326D, and 326E. The BBU can then begin scheduling DL and/or UL transmissions between the UEs 102A-102J and nodes 104A-104J in accordance with the active sets 306A-306B, 316C, 326D, and 326E. Here, the BBU determines that none of the remaining active sets 306A-306B, 316C, 326D, and 326E are bad active sets. Thus, the active set management scheme is complete.

The BBU can repeat the above operations any number of times until no bad active sets remain. Generally, a combined active set formed from the combinations of all active sets 306A-306J would be considered a good active set. Thus, the BBU will eventually settle on or converge to a combination of node 104 and UE 102 groupings that minimizes interference and capacity issues.

In some embodiments, the BBU determines the metrics and identifies the highest metrics before combining any active sets. A situation may arise in which the BBU determines metrics that indicate that active set 1 should be combined with active set 2, active set 2 should be combined with active set 3, and active set 3 should be combined with active set 1 (e.g., a cyclic scenario). The BBU may not immediately form these combinations because of the circular nature of these combinations (e.g., the BBU may prefer to combine two active sets in one iteration rather than three active sets in one iteration). Thus, before combining any active sets, the BBU may identify the metric of the metrics initially identified as being the highest metrics for their respective active sets (e.g., the metric associated with active set 1 and 2, the metric associated with active set 2 and 3, and the metric associated with active set 3 and 1) that has the highest value. The BBU may then combine the two active sets associated with the metric having the highest value. As an illustrative example, the BBU may determine that the metric associated with active sets 2 and 3 has a higher value than the metric associated with active sets 1 and 2 or active sets 3 and 1. Thus, the BBU may only combine active 2 and 3, not active sets 1 and 2 or 3 and 1.

Another situation may arise in which the BBU determines metrics that indicate that active set 1 should be combined with active set 2 and active set 2 should be combined with active set 3, where active set 3 is a good active set (e.g., another cyclic scenario). The BBU may not immediately form these combinations. Thus, before combining any active sets, the BBU may identify the metric of the metrics initially identified as being the highest metrics for their respective active sets (e.g., the metric associated with active set 1 and 2 and the metric associated with active set 2 and 3) that has the highest value. The BBU may then combine the two active sets associated with the metric having the highest value. As an illustrative example, the BBU may determine that the metric associated with active sets 2 and 3 has a higher value than the metric associated with active sets 1 and 2. Thus, the BBU may only combine active 2 and 3, not active sets 1 and 2.

In further embodiments, an active set 306A-306J may have a maximum size (e.g., a maximum number of UEs that can be served). If the size of an active set 306A-306J is less than or equal to the maximum size, then the BBU may proceed with the active set management scheme operations described above. However, if an active set 306A-306J exceeds the maximum size, then the BBU may remove one or more UEs 102 from the active set 306A-306J if the number of available MIMO dimensions in the active set 306A-306J is below the first threshold value. The number of UEs 102 removed may be determined to be the number that results in the active set 306A-306J not exceeding the maximum size and/or having a number of available MIMO dimensions at or above the first threshold value. The BBU may leave an active set 306A-306J the same if an active set 306A-306J exceeds the maximum size and the level of interference in the active set 306A-306J exceeds the second threshold value.

Thus, the BBU can group the nodes 104 and UEs 102 such that all nodes 104 serve all UEs 102, each node 104 serves one or more UEs 102, or any combination in-between. Unlike conventional BBUs, the BBU that executes the active set management scheme described herein forms active sets based on metrics or other values that are dependent on nodes 104 and/or UEs 102 in other active sets. In other words, the BBU that executes the active set management scheme may not simply form an active set for a UE 102 based on what are the best node(s) 104 to serve the UE 102. Rather, the BBU that executes the active set management scheme forms an active set for a UE 102 not only based on what may be the best node(s) 104 to serve the UE 102, but also based on other factors, such as what might be the best node(s) 104 to serve other UEs 102.

For simplicity and ease of explanation, the BBU is described as executing the active set management scheme operations described herein. However, one or more nodes 104 can execute the active set management scheme operations in place of the BBU. Alternatively or in addition, one or more nodes 104 and the BBU can jointly execute the active set management scheme operations.

Figure 4:
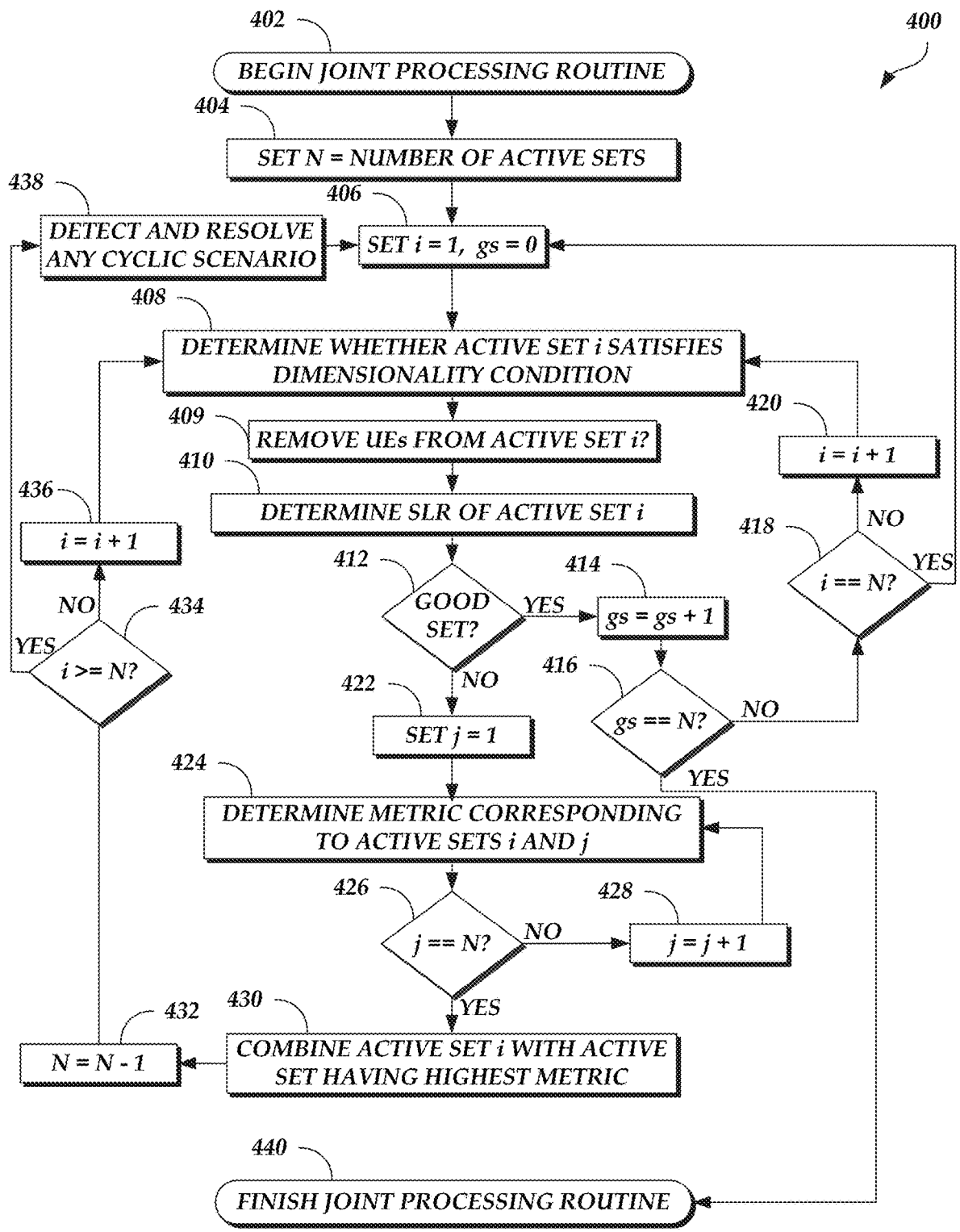
FIG. 4 is a flow diagram depicting a joint processing routine illustratively implemented by a node and/or a BBU, according to one embodiment.

FIG. 4 is a flow diagram depicting a joint processing routine 400 illustratively implemented by a node and/or a BBU, according to one embodiment. As an example, a node 104A-104J of FIG. 3A and/or a BBU, such as the BBU 710 of FIG. 7 and/or the BBU 802 of FIG. 8, can be configured to execute the joint processing routine 400. The joint processing routine 400 may also be referred to as an active set management scheme. The joint processing routine 400 begins at block 402.

At block 404, a variable N is set equal to a number of active sets in a MIMO network. For example, the number of active sets may initially be equal to the number of nodes 104 in the MIMO network.

At block 406, a variable i is set equal to 1, and a variable gs is set equal to 0. Variable i may identify a particular active set, and variable gs may be a count indicating how many existing active sets are good active sets.

At block 408, a determination is made as to whether the active set i satisfies a dimensionality condition. In the context of DL transmissions, the dimensionality condition may be that the number of available MIMO transmit dimensions is at or exceeds the minimum number of MIMO transmit dimensions required to properly serve all of the UEs 102 associated with the active set i. Thus, in the context of DL transmissions, the dimensionality condition may be satisfied if the number of available MIMO transmit dimensions is greater or equal to the first threshold value. Similarly, in the context of UL transmissions, the dimensionality condition may be that the number of available MIMO receive dimensions is at or exceeds the minimum number of MIMO receive dimensions required to properly serve all of the UEs 102 associated with the active set i. Thus, in the context of UL transmissions, the dimensionality condition may be satisfied if the number of available MIMO receive dimensions is greater or equal to the first threshold value.

At block 409, UEs are optionally removed from active set i. For example, active set i may have a maximum size (e.g., a maximum number of UEs that can be served). If the active set i has a size (e.g., a number of UEs being served) greater than the maximum size and the number of available MIMO dimensions in the active set i is below the first threshold value, then the joint processing routine 400 may remove one or more UEs from the active set i so that the size of the active set i falls below the maximum size and/or the active set i has a number of available MIMO dimensions that is at or above the first threshold value.

At block 410, the SLR of active set i is determined. In other words, the level of interference in active set i is determined.

At block 412, a determination is made as to whether active set i is a good active set or a bad active set. The determination may be made based on whether the active set i satisfies the dimensionality condition and/or whether the SLR of the active set i is at or below the second threshold value. If the active set i satisfies the dimensionality condition and the SLR of the active set i is below the second threshold value, then the active set i is a good active set and the joint processing routine 400 proceeds to block 414. Otherwise, if the active set i does not satisfy the dimensionality condition or the SLR of the active set i is above the second threshold value, then the active set i is a bad active set and the joint processing routine 400 proceeds to block 422.

While block 408 is depicted as being performed prior to block 410, this is not meant to be limiting. For example, block 410 can be performed prior to block 408.

Optionally, the joint processing routine 400 may proceed directly to block 422 from block 408 if the active set i does not satisfy the dimensionality condition. Otherwise, if the active set i satisfies the dimensionality condition, then the joint processing routine 400 may proceed to block 410 (or block 412 if block 410 has already been performed). If block 410 is performed prior to block 408, then the joint processing routine 400 may proceed directly to block 422 from block 410 if the SLR of the active set i is above the second threshold value. Otherwise, if the SLR of the active set i is at or below the second threshold value, then the joint processing routine 400 may proceed to block 408.

At block 414, the variable gs is incremented by 1 given that a new good active set has been identified. After incrementing variable gs, the joint processing routine 400 proceeds to block 416.

At block 416, a determination is made as to whether the variable gs is equal to the variable N. If the two variables are equal, this indicates that all of the existing active sets are good active sets. Thus, the joint processing routine 400 proceeds to block 440, and the joint processing routine 400 is complete. However, if the two variables are not equal, this indicates that either some of the existing active sets are bad active sets or not all of the existing active sets have been evaluated yet. Thus, the joint processing routine 400 proceeds to block 418.

At block 418, a determination is made as to whether the variable i is equal to the variable N. If the two variables are equal, this indicates that all of the existing active sets have been evaluated and at least one of the existing active sets is a bad active set. Thus, the joint processing routine 400 reverts back to block 406 so that the next iteration of active set combining can be performed in an attempt to combine the bad active set(s) with other active sets to form good active sets. Otherwise, if the two variables are not equal, this indicates that not all of the existing active sets have been evaluated. Thus, the joint processing routine 400 proceeds to block 420 so that the next active set can be evaluated.

At block 420, the variable i is incremented by 1. After incrementing variable i, the joint processing routine 400 reverts back to block 408 (or block 410) so that the next active set referenced by the incremented variable i can be evaluated.

At block 422, a variable j is set equal to 1. Variable j may identify a particular active set that could eventually be combined with active set i.

At block 424, a metric corresponding to active sets i and j is determined. For example, the metric may generally represent the capacity and link quality of an active set formed by combining or merging active sets i and j. The metric can be computed using either the first formulation based on SNR or the second formulation based on SLR, as described above.

At block 426, a determination is made as to whether variable j is equal to variable N. If the two variables are equal, this indicates that metrics have been determined for each combination or pair of active set i and another existing active set. Thus, the joint processing routine 400 proceeds to block 430. Otherwise, if the two variables are not equal, this indicates that not all of the metrics have been determined for each combination or pair of active set i and another existing active set. Thus, the joint processing routine 400 proceeds to block 428.

At block 428, the variable j is incremented by 1. Optionally, the joint processing routine 400 may increment the variable j by 2 if, for example, incrementing variable j by 1 would result in variable i and variable j being equal and variable i is less than variable N, or may proceed to block 430 if, for example, incrementing variable j by 1 would result in variable i and variable j being equal and variable i is equal to variable N. In other words, the joint processing routine 400 may avoid having variables i and j being equal given that the joint processing routine 400 is attempting to determine metrics that are each associated with different pairs of active sets. After incrementing variable j, the joint processing routine 400 reverts back to block 424 so that the next metric can be determined.

At block 430, active set i is tentatively combined with an active set associated with a highest metric. For example, the joint processing routine 400 can analyze all of the metrics determined for active set i, identify the metric with the highest value, identify the other existing active set associated with the metric, and tentatively combine the nodes 104 and UEs 102 of this active set and the active set i to form a combined active set. The joint processing routine 400 may tentatively combine the nodes 104 and UEs 102 of this active set and the active set i because a situation may arise in which the joint processing routine 400 determines metrics indicating that a cyclic scenario is present, as described above. The combination may be finalized or discarded after the cyclic scenario is detected and resolved at block 438. If the combination is finalized, the active set i and the active set combined with the active set i may be removed from a list or data structure identifying existing active sets and the combined active set may be added to the list or data structure identifying existing active sets. After tentatively combining the active sets, the joint processing routine 400 can proceed to block 432.

At block 432, the variable N is decremented by 1 given that two active sets have been combined into one active set. In other words, the number of existing active sets has now dropped by 1. After decrementing variable N, the joint processing routine 400 proceeds to block 434.

At block 434, a determination is made as to whether the variable i is greater than or equal to variable N. If variable i is greater than or equal to variable N, this indicates that all bad active sets have been evaluated and combined with another active set. Thus, the joint processing routine 400 proceeds to block 438 to detect and resolve any cyclic scenario, and then reverts back to block 406 so that a determination can be made whether any bad active sets remain and, if so the next iteration of active set combining can then be performed in an attempt to combine the remaining bad active set(s) with other active sets to form good active sets. Otherwise, if variable i is less than variable N, then additional existing active sets still need to be evaluated and the joint processing routine 400 therefore proceeds to block 436.

At block 436, the variable i is incremented by 1. After incrementing variable i, the joint processing routine 400 reverts back to block 408 (or block 410) so that the next active set referenced by the incremented variable i can be evaluated.

At block 438, any potential cyclic scenario is detected and resolved. For example, a situation may arise in which the joint processing routine 400 determines metrics that indicate that active set i should be combined with active set j, active set j should be combined with active set j+1, and active set j+1 should be combined with active set i. As another example, a situation may arise in which in the joint processing routine 400 determines metrics that indicate that active set i should be combined with active set j and active set j should be combined with active set j+1, where active set j+1 is a good active set. The joint processing routine 400 may not immediately combine these active sets or may tentatively combine these active sets, such as at block 430. If the cyclic scenario is detected, the joint processing routine 400 can resolve the cyclic scenario by identifying the metric of the metrics initially identified as being the highest metrics for their respective active sets that has the highest value (or second highest value, or third highest value, etc.). The joint processing routine 400 may then combine or finalize the combination of the two active sets associated with the metric having the highest value. Optionally, the joint processing routine 400 can discard the combination of active sets associated with the metric not having the highest value (or second highest value, or third highest value, etc.). After detecting and resolving any potential cyclic scenario, the joint processing routine 400 reverts back to block 406.

While block 438 is depicted as being performed after block 434, this is not meant to be limiting. For example, block 438 can be performed prior to block 434.

Figure 5:
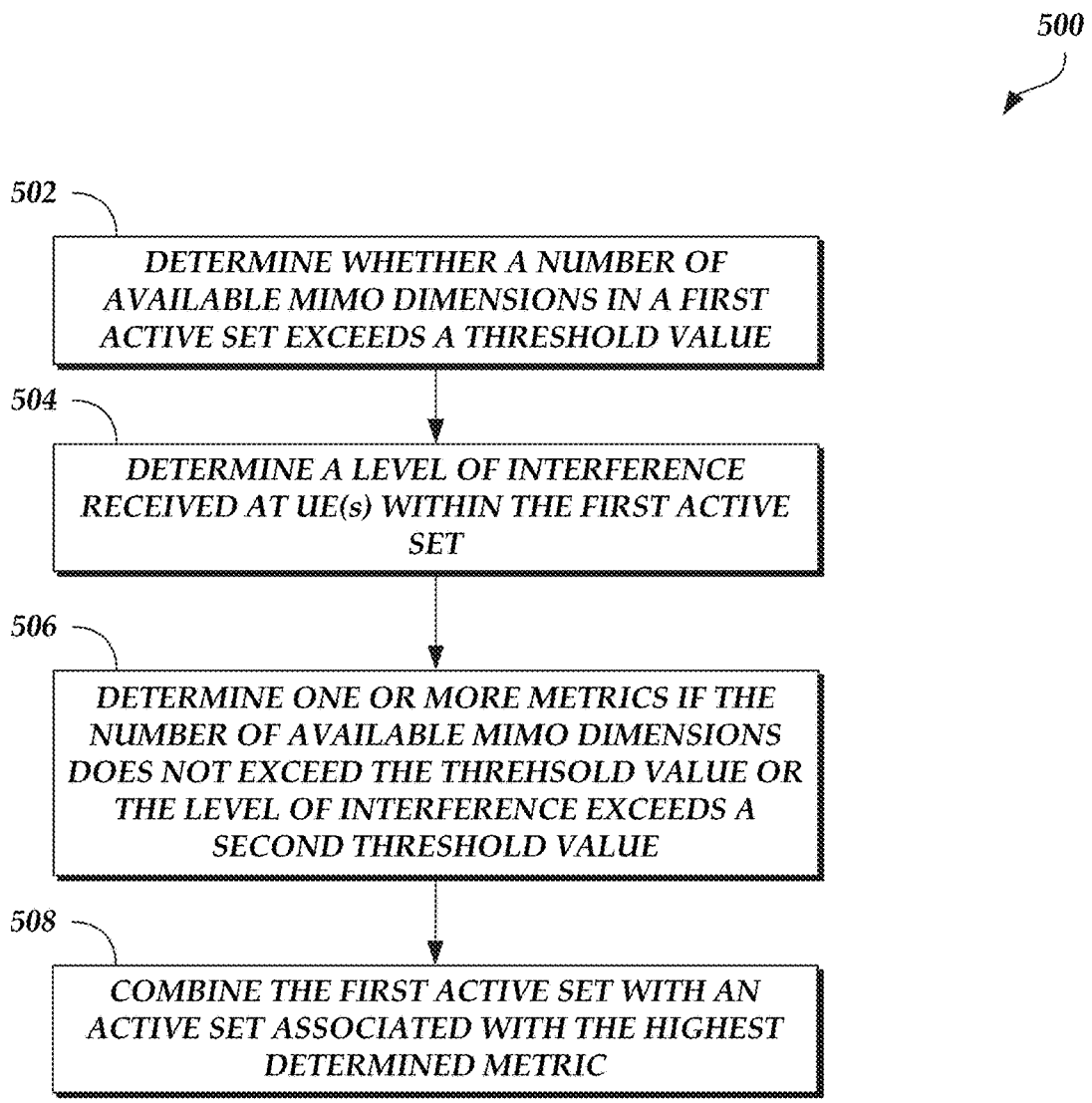
FIG. 5 is a flow diagram depicting an active set management scheme routine for DL transmissions illustratively implemented by a node and/or a BBU, according to one embodiment.

FIG. 5 is a flow diagram depicting an active set management scheme routine 500 for DL transmissions illustratively implemented by a node and/or a BBU, according to one embodiment. As an example, a node 104A-104J of FIG. 3A and/or a BBU, such as the BBU 710 of FIG. 7 and/or the BBU 802 of FIG. 8, can be configured to execute the active set management scheme routine 500. The active set management scheme routine 500 begins at block 502.

At block 502, whether a number of available MIMO dimensions in a first active set exceeds a threshold value is determined. For example, the threshold value may be the first threshold value described above.

At block 504, a level of interference received at the UE(s) within the first active set is determined. For example, the level of interference received at the UE(s) within the first active set may be the SLR of signals transmitted from node(s) within the first active set to UE(s) within the first active set.

At block 506, one or more metrics are determined if the number of available MIMO dimensions does not exceed the threshold value or if the level of interference exceeds a second threshold value. For example, the first active set may be a bad active set if the number of available MIMO dimensions does not exceed the threshold value (e.g., the first active set lacks sufficient capacity) or if the level of interference exceeds a second threshold value. Thus, one or more metrics may be determined for the first active set. The metric(s) may each be associated with the first active set and another existing active set.

At block 508, the first active set is combined with an active set associated with the highest determined metric. After combining the first active set with the active set associated with the highest determined metric, blocks 502, 504, 506, and/or 508 may be repeated until the combined first active set (or subsequent combined first active sets) is no longer a bad active set.

Figure 6:
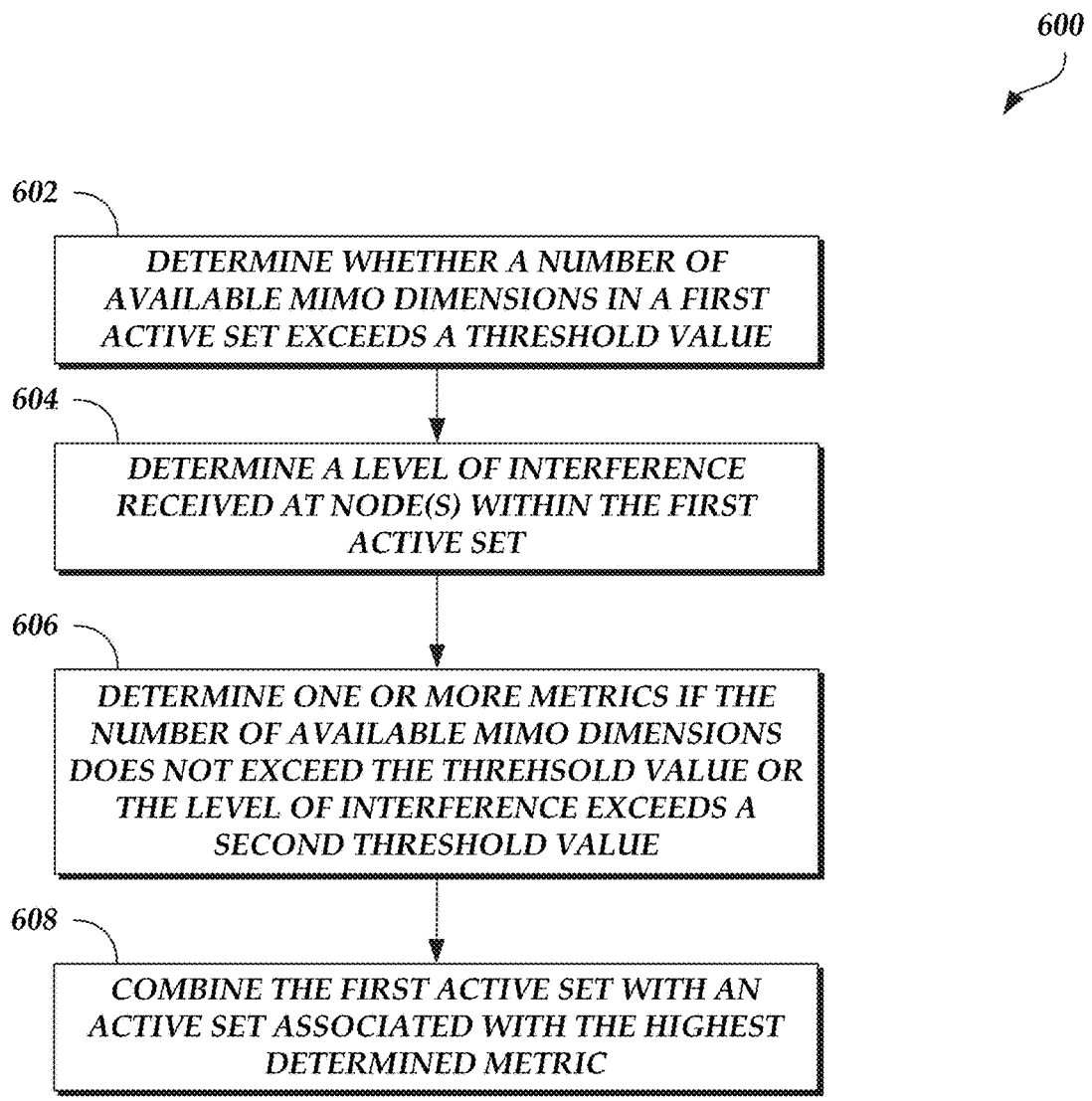
FIG. 6 is a flow diagram depicting an active set management scheme routine for UL transmissions illustratively implemented by a node and/or a BBU, according to one embodiment.

FIG. 6 is a flow diagram depicting an active set management scheme routine 600 for UL transmissions illustratively implemented by a node and/or a BBU, according to one embodiment. As an example, a node 104A-104J of FIG. 3A and/or a BBU, such as the BBU 710 of FIG. 7 and/or the BBU 802 of FIG. 8, can be configured to execute the active set management scheme routine 600. The active set management scheme routine 600 begins at block 602.

At block 602, whether a number of available MIMO dimensions in a first active set exceeds a threshold value is determined. For example, the threshold value may be the first threshold value described above.

At block 604, a level of interference in signal(s) received at the node(s) within the first active set is determined. For example, the level of interference received at the node(s) within the first active set may be the SLR of signals transmitted to node(s) within the first active set from UE(s) within the first active set.

At block 606, one or more metrics are determined if the number of available MIMO dimensions does not exceed the threshold value or if the level of interference exceeds a second threshold value. For example, the first active set may be a bad active set if the number of available MIMO dimensions does not exceed the threshold value (e.g., the first active set lacks sufficient capacity) or if the level of interference exceeds a second threshold value. Thus, one or more metrics may be determined for the first active set. The metric(s) may each be associated with the first active set and another existing active set.

At block 608, the first active set is combined with an active set associated with the highest determined metric. After combining the first active set with the active set associated with the highest determined metric, blocks 602, 604, 606, and/or 608 may be repeated until the combined first active set (or subsequent combined first active sets) is no longer a bad active set.

Figure 7:
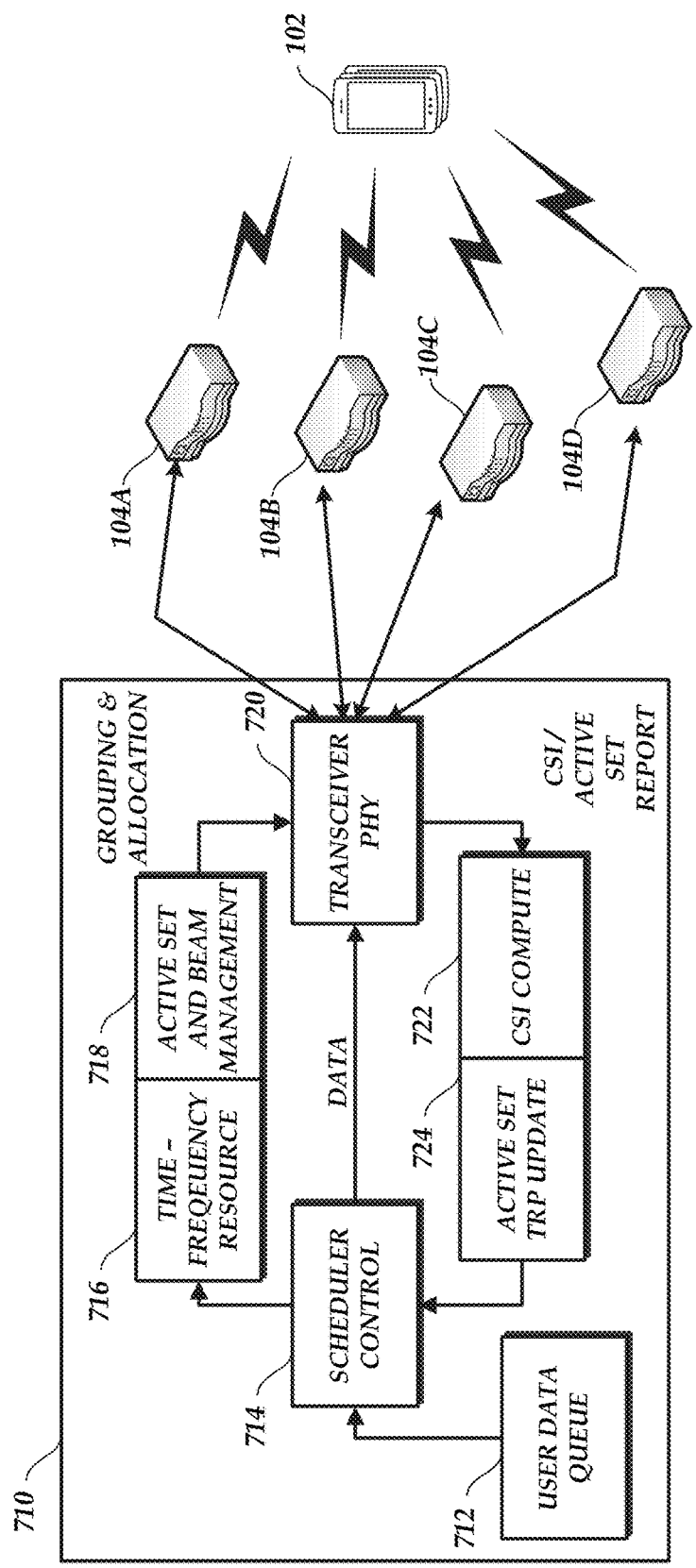
FIG. 7 is a schematic diagram illustrating a cooperative MIMO wireless network that includes a baseband unit according to an embodiment.

FIG. 7 is a schematic diagram illustrating a cooperative MIMO wireless network 700 that includes a baseband unit 710 according to an embodiment. In this embodiment, the nodes 104A-104D may operate as RRUs or serving nodes, and the baseband unit 710 (e.g., BBU 710) may select spatial beam(s) to serve UEs 102A-102J, execute an active set management scheme to form active sets for the UEs 102A-102J, and/or schedule data transmissions over the spatial beam(s) selected to serve the UEs 102A-102J based on data provided by the nodes 104A-104D.

As illustrated in FIG. 7, the baseband unit 710 includes a user data queue block 712, a scheduler control 714, a time/frequency resource allocation block 716, an active set and beam management block 718, a transceiver 720, a CSI computation block 722, and an active set serving node update block 724. The baseband unit 710 can include any suitable physical hardware to implement the illustrated blocks. For example, the baseband unit 710 can include a processor and computer readable storage to implement any suitable blocks shown in FIG. 7. The cooperative MIMO wireless network 700 also includes the nodes 104A-104D and one or more UEs 102. The cooperative MIMO wireless network 700 optionally includes other nodes 104, not shown.

The baseband unit 710 includes a scheduler that executes the active set management scheme described herein and schedules user data for wireless transmission between serving nodes 104 and UEs 102 over various spatial beams. The scheduler can select spatial beam(s) to serve UEs 102, can execute the active set management scheme to form active sets for the UEs 102, can schedule DL data traffic for simultaneous transmission to multiple UEs 102, can schedule DL data traffic in a time division multiplexed fashion such that DL data traffic is transmitted to one UE 102 during a first time slot and is transmitted to a second UE 102 during a second time slot after (or before) the first time slot, can schedule UL data traffic for simultaneous transmission by multiple UEs 102, and can schedule UL data traffic in a time division multiplexed fashion such that UL data traffic is transmitted by one UE 102 during a first time slot and is transmitted by a second UE 102 during a second time slot after (or before) the first time slot. The serving nodes 104 can alternatively be referred to as transmission points for DL data transmission. The scheduler can schedule data from any suitable number of serving nodes 104 to any suitable number of UEs 102. The scheduler can include the user data queue block 712, the scheduler control 714, the time/frequency resource allocation block 716, the active set and beam management block 718, the CSI computation block 722, and the active set serving node update block 724.

The transceiver 720 can provide a UE report from the UE 102 to the scheduler. For example, the UE report can include spatial beam link strengths, spatial beam link quality, and/or other CSI suitable for allowing the scheduler to select spatial beam(s) to serve the UEs 102, execute the active set management scheme to form active sets for the UEs 102, schedule DL data transmissions, and/or schedule UL data transmissions. The CSI computation block 722 can compute CSI data from data in the UE report. The active set serving node update block 724 can determine an updated active set for one or more UEs 102 based on updated link strength information provided by the UE(s) 102 (e.g., provided by the UE(s) 102 in response to receiving DL data traffic, as described above) and/or by executing the active set management scheme described herein. In some instances, the active set serving node update block 724 can determine an updated active set for a subset of one or more antennas of a UE 102. The active set serving node update block 724 can use any suitable metrics disclosed herein to update an active set associated with a UE 102.

The updated active set data is provided to the scheduler control 714. The user data queue block 712 can provide user data to the scheduler control 714. The scheduler control 714 provides user data to the transceiver 720 and also provides instructions to the time/frequency resource allocation block 716. The time/frequency resource allocation block 716 can schedule timing and frequency of DL and/or UL data transmission from and/or to serving nodes 104 (e.g., generate scheduling data), which can be forwarded to the nodes 104 via the transceiver 720. This can avoid timing conflicts and conflicts in the frequency domain. The active set and beam management block 718 can select serving nodes 104 and/or specific spatial beams offered by these serving nodes 104 for providing wireless transmission services to UEs 102, and create corresponding active sets for the UEs 102 in a manner as described herein. The active set and beam management block 718 can group DL data transmissions and manage beamforming from the serving nodes 104 to the UEs 102. The transceiver 720 provides data for transmission by the serving nodes 104 to UEs 102.

As illustrated in FIG. 7, the scheduler can cause a network system of the cooperative MIMO wireless network 700 to wirelessly transmit first user data to a first UE 102 across one or more spatial beams, to transmit second user data to a second UE 102 across one or more spatial beams, and so on. The scheduler can cause the transmissions of the first user data, the second user data, etc. to occur simultaneously and/or at different times. Moreover, the scheduler can cause a network system of the cooperative MIMO wireless network 700 to wirelessly transmit user data to any suitable number of UEs 102 across one or more spatial beams served by one or more serving nodes 104.

Figure 8:
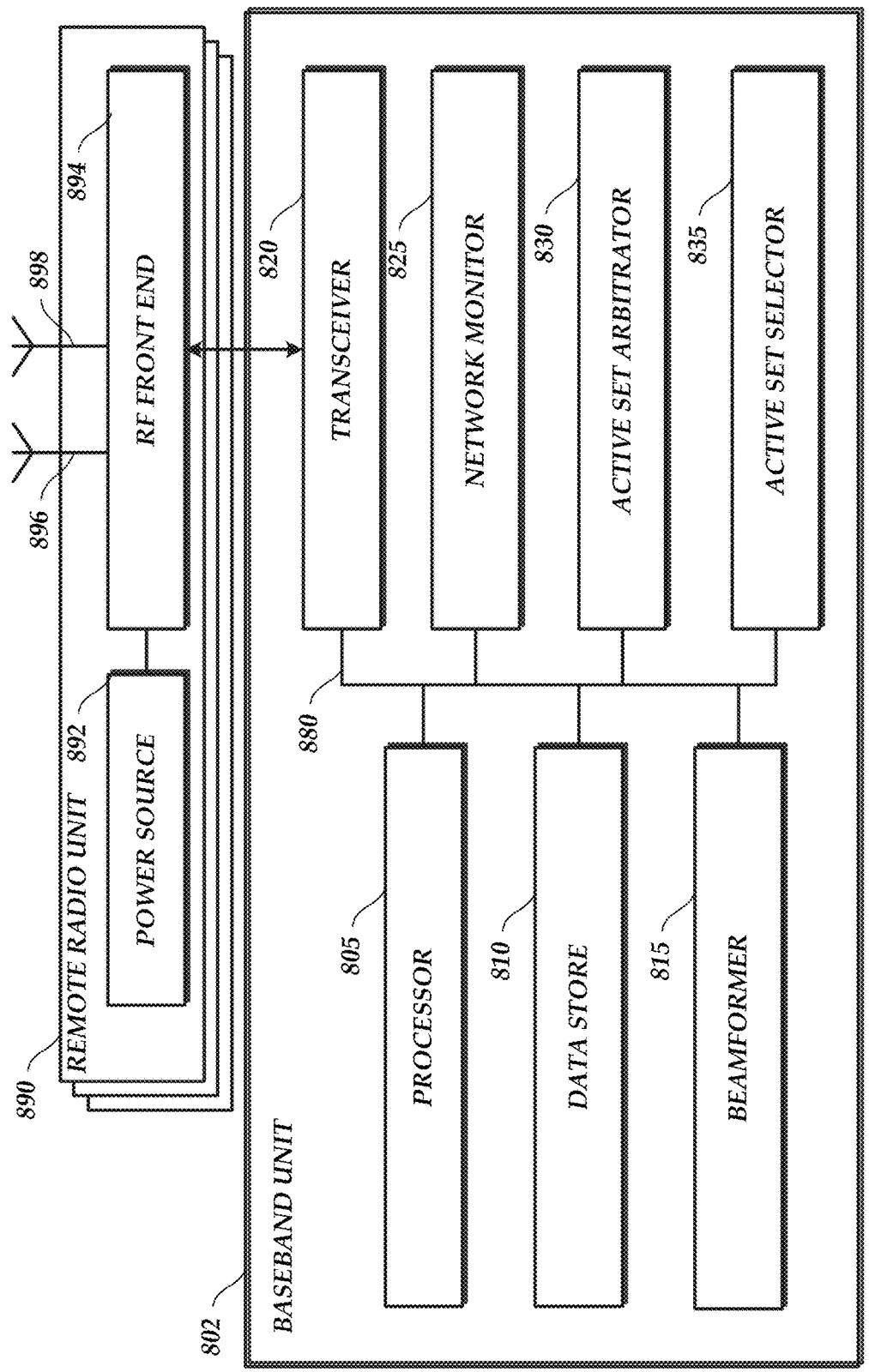
FIG. 8 is a block diagram illustrating an example baseband unit and remote radio unit according to an embodiment.

FIG. 8 is a block diagram illustrating an example baseband unit 802 and remote radio unit 890 according to an embodiment. The baseband unit 802 may be coupled with at least one remote radio unit 890. The remote radio unit 890 may include at least a first antenna 896 and a second antenna 898 for MIMO wireless communications. Any antenna disclosed herein, such as the antenna 896 or the antenna 898, can be referred to as antenna element. The first antenna 896 and the second antenna 898 may be coupled with a radio frequency (RF) front end 894. The RF front end 894 may process signals received via the first antenna 896 and the second antenna 898. Part of processing a signal may include transmitting the signal to a transceiver 820 included in the BBU 802.

A processor 805 may receive signals received by the transceiver 820. The processor 805 may be configured to determine a type of the signal. For example, if the signal includes a request for connection services, the processor 805 may provide the signal to an active set selector 835. The active set selector 835 may be configured to identify an active set of serving nodes to provide the requested downlink data transmission service, such as by executing the active set management scheme described herein. The active set selector 835 can identify the active set for a UE based on information associated with the UE. Alternatively or additionally, the active set selector 835 can identify the active set for a UE based on information associated with one or more other UEs. In some instances, the active set selector 835 can identify specific spatial beam(s) selected to serve a UE. The BBU 802 may include a network monitor 825 to detect characteristics of the network such as the number of UEs served by each RRU, network data transmission load, and/or the like. The active set selector 835 may receive the network characteristics from the network monitor 825 as a factor considered when selecting spatial beam(s) to serve a UE and/or identifying an active set for a UE.

A beamformer 815 may be included in the BBU 802 to further identify parameters for the serving nodes (e.g., RRUs) included in an active set. The parameters may include one or more of transmission mode, time, frequency, power, beamforming matrix, tone allocation, or channel rank. The beamformer 815 may determine optimal parameters for RRUs coupled with the BBU 802 that facilitate a network-wide optimization of downlink data transmissions. In some implementations, the active set selector 835 determines an active set for a UE based, in part, on information provided by the UE. In other implementations, a UE may provide a requested active set. The BBU 802 may include an active set arbitrator 830 to reconcile a requested active set with an active set selected by the active set selector 835. The active set arbitrator 830 may compare a requested set of serving nodes to the serving nodes identified by the active set selector 835. The comparison may include ordering the serving nodes according to the UE recommendation. In some implementations, the active set arbitrator 830 may provide a message to the UE indicating confirmation or other assessment for a requested active set. For example, if the UE requested nodes A and B but the BBU 802 identified only B in the active set, the message may include a code indicating a partial match for the active set. Other status codes may be included to facilitate efficient communication and assessment of requested active sets. The active set arbitrator 830 may additionally or alternatively compare a requested transmission mode to the transmission mode identified by the active set selector 835 or other element of the BBU 802.

The BBU 802 may include a data store 810. The data store 810 may include instructions that can be executed by the processor 805 to implement the features described herein. In some implementations, the data store 810 may retain active sets or other scheduling information assigned to UEs served by the BBU 802. The data store 810 may be indexed by UE identifier and/or RRU identifier. This can expedite identification of previously communicated scheduling information for the UE and for monitoring network conditions (e.g., number of UEs allocated to an RRU or antenna element of an RRU).

In addition to providing the scheduling information to the UE, the scheduling information may be used to configure the RRU 890. The configuration may include adjusting the first antenna 896 such as by frequency modulation, time modulation, altering transmission power from a power source 892, or adjusting direction, tone allocation, or beamforming of the transmission.

As discussed above, a variety of different UEs can wirelessly communicate with serving nodes in a cooperative MIMO network. An example UE will be discussed with reference to FIG. 9.

Figure 9:
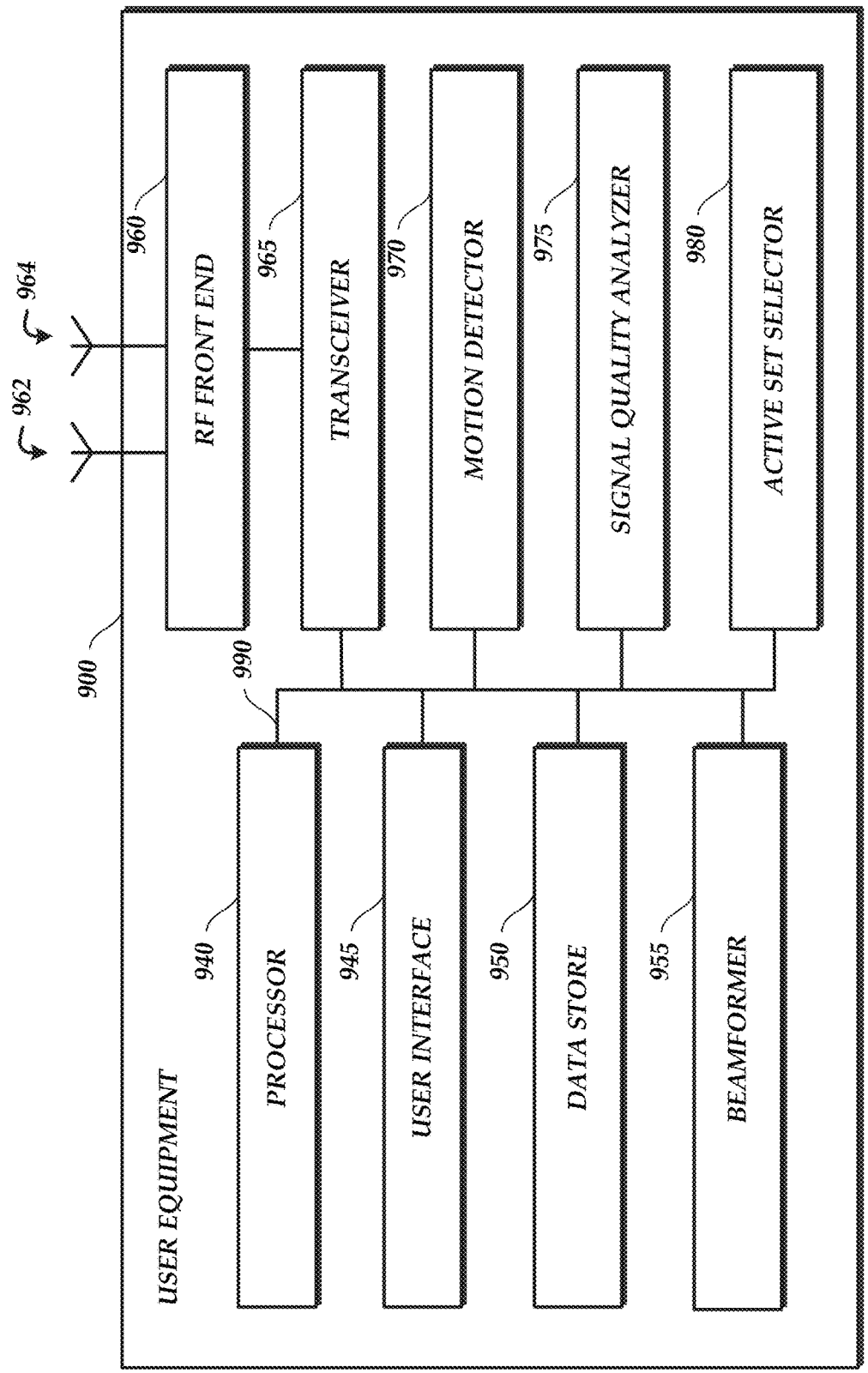
FIG. 9 is a schematic block diagram of an example UE according to an embodiment.

FIG. 9 is a schematic block diagram of an example UE 900 according to an embodiment. The UE 900 is configured for wirelessly communicating with a base station in a cooperative MIMO network. As illustrated in FIG. 9, the UE 900 includes a processor 940, a user interface 945, a data store 950, a beamformer 955, antennas 962 and 964, a transceiver 965, a motion detector 970, a signal quality analyzer 975, and an active set selector 980. Some other UEs can include additional elements and/or a subset of the elements illustrated in FIG. 9.

The UE 900 includes a plurality of antennas 962 and 964. Any suitable number of antennas can be included for wireless communication. The UE 900 can include one or more arrays of antennas. A radio frequency (RF) front end 960 can process RF signals received via the antennas 962 and 964. The RF front end can also provide RF signals to the antennas 962 and 964 for transmission. The transceiver 965 includes a transmitter and a receiver. The transceiver 965 can provide processing for transmitting and receiving RF signals associated with the antennas 962 and 964. For example, upon receiving active set data, the processor 940 can configure the transceiver 965 (e.g., receiver) to receive DL data associated with the spatial beam(s) identified in the active set data as being selected to serve the UE 900.

The processor 940 is in communication with the transceiver 965. The processor 940 is implemented by physical hardware arranged to perform specific operations to implement functionality related to determining a link strength of spatial beams over which beam pilots and/or user data are transmitted. The processor 940 can determine the link strength, identify a spatial beam that provides the best link strength, and/or generate one or more messages to report the link strength to a serving node in accordance with any suitable principles and advantages disclosed herein. The processor 940 can cause active set and neighbor set data to be stored and updated. The processor 940 can perform any other suitable processing for the UE 900.

The processor 940 can be in communication with the motion detector 970 and the signal quality analyzer 975. Accordingly, the processor 940 can receive and process information associated with conditions of the UE 900. The motion detector 970 can include any suitable hardware arranged to detect mobility information associated with the UE 900. The signal quality analyzer 975 can analyze the quality of signals received and/or transmitted by the antennas 962 and 964. This can provide information associated with a spatial channel condition of the UE 900. The information associated with conditions of the UE 900 can be provided to the processor 940 for providing to the serving node(s). In some instances, some or all of the functionality of the motion detector 970 and/or the signal quality analyzer can be implemented by the processor 940.

The active set selector 980 is optional and can identify a desired active set of one or more serving nodes. The active set selector 980 can select the desired active set based on data associated with one or more of: one or more serving nodes in the active set, one or more serving nodes in the neighbor set, mobility data associated with the UE 900, a spatial channel condition associated with the UE 900, the link strength and/or the link quality of one or more spatial beams served by one or more serving nodes, or one or more characteristics of the UE 900. The active set selector 980 can optionally execute the active set management scheme to identify a desired active set. The active set selector 980 can cause the processor 940 to generate a message for transmission to a serving node and/or a BBU to request that a selected spatial beam (or selected spatial beams) be added to an active set for the UE 900 (e.g., request that a selected spatial beam, which may be different than the spatial beam(s) already included in an active set for the UE 900, be included in an updated active set for the UE 900). The active set selector 980 can be implemented by dedicated circuitry and/or circuitry of the processor 940.

The beamformer 955 can perform any suitable beamforming functionality for the UE 900. The beamformer 955 can set and/or adjust one or more parameters associated with receiving and/or transmitting signals associated with the antennas 962 and 964 of the UE 900. The beamformer 955 can be implemented by dedicated circuitry and/or circuitry of the processor 940.

The UE 940 includes a data store 950. The data store 950 can store instructions that can be executed by the processor 940 to implement the features described herein. The data store 950 can store active set data and neighbor set data for the UE 900. The data store 950 can store spatial beam link strengths and/or link qualities. The data store 950 can store any other suitable data for the UE 900. The data store 950 can include any suitable memory elements arranged to store data.

Several elements included in the UE 900 may be coupled by a bus 990. The bus 990 can be a data bus, communication bus, other bus, or any suitable combination thereof to enable the various components of the UE 900 to exchange information.

As illustrated in FIG. 9, the UE 900 also includes a user interface 945. The user interface 945 can be any suitable user interface, such as a display and/or an audio component. In some instances, the user interface 945 can include one or more of touch screen capabilities, a button, a knob, a switch, or a slider.

TERMINOLOGY, APPLICATIONS, AND CONCLUSION

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

As used herein a "transmit-receive point" (TRP) (which can alternatively be referred to as a transmission reception point) may refer to a transceiver device or one transceiver element included in a device. When included as a transceiver element, the device may include multiple TRPs. The TRP may include one or more antennas which are coupled to signal processing circuitry. The signal processing circuitry may be included in the device. The TRP may include additional elements to facilitate transmission or receipt of wireless signals for one or more UEs. Example of such elements may include a power source, amplifier, digital-to-analog converter, analog-to-digital converter, or the like. When a TRP is allocated, such as by a BBU, to provide service to a UE, the TRP may be said to be a "serving node" for the UE.

As used herein a "remote radio unit" (RRU) may refer to a device for controlling and coordinating transmission and receipt of wireless signals for one or more UEs. An RRU may include or be coupled with one or more TRPs. The RRU may receive signals from the TRP and include the signal processing circuitry. The signal processing circuitry may be selectively operated to facilitate processing of signals associated with different TRPs.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A network system comprising:
   a plurality of nodes, wherein each node is configured to communicate with one or more user equipment (UEs), and wherein each node initially corresponds to a separate active set; and
   a scheduler in communication with the plurality of nodes, the scheduler comprising a processor and computer-executable instructions, wherein the computer-executable instructions, when executed by the processor, cause the scheduler to:
   for a first active set,
      determine whether a number of available MIMO dimensions in the first active set exceeds a threshold value;
      determine a level of interference received at one or more UEs within the first active set;
      in response to a determination that at least one of (a) the number of available MIMO dimensions in the first active set does not exceed the threshold value or (b) a determination that the level of interference within the first active set exceeds a second threshold value,
         determine one or more metrics, each metric associated with the first active set and an active set other than the first active set; and
         combine the first active set with an active set associated with the highest metric in the one or more metrics.

2. The network system of claim 1, wherein a first node in the plurality of nodes corresponds to the first active set, wherein a second node in the plurality of nodes corresponds to a second active set, and wherein a first metric in the one or more metrics is associated with the first active set and the second active set.

3. The network system of claim 2, wherein the first metric is based on a number of MIMO dimensions provided by a combination of the first node and the second node.

4. The network system of claim 3, wherein the number of MIMO dimensions provided by the combination of the first node and the second node comprises a number of transmit streams collectively provided by the first node and the second node.

5. The network system of claim 4, wherein the first metric is based on a total number of available transmit streams collectively provided by the first node and the second node and a total number of available receive streams collectively provided by UEs served by either the first node or the second node.

6. The network system of claim 5, wherein the total number of available transmit streams comprises a minimum of a number of transmit antenna elements and a number of available transmission radio frequency (RF) chains collectively provided by the first node and the second node.

7. The network system of claim 2, wherein the first metric is based on a signal-to-noise ratio of a signal between the first node and a first UE in one or more UEs served by the second node.

8. The network system of claim 7, wherein the first metric is further based on a signal-to-noise ratio of a second signal between the second node and a second UE in one or more UEs served by the first node.

9. The network system of claim 2, wherein the first metric is based on a signal-to-leakage ratio of an energy of a signal from a combination of the first node and the second node to one or more UEs served by the combination over a leakage of the signal to one or more UEs not served by the combination.

10. The network system of claim 2, wherein the computer-executable instructions, when executed, further cause the scheduler to:
   apply, for each UE in one or more UEs served by the second node, a function to a signal-to-noise ratio of a signal between the first node and the respective UE served by the second node to form a first value;

sum the first values;
apply, for each UE in one or more UEs served by the first node, a function to a signal-to-noise ratio of a signal between the second node and the respective UE served by the first node to form a second value;
sum the second values; and
determine the first metric based on the summed first values and the summed second values.

11. The network system of claim 2, wherein the first metric is based on a level of interference between the first active set and the second active set.

12. The network system of claim 11, wherein the level of interference between the first active set and the second active set comprises a signal-to-leakage ratio associated with the first active set and the second active set.

13. The network system of claim 1, wherein the computer-executable instructions, when executed, further cause the scheduler to repeat operations to combine active sets until each active set has a number of available MIMO dimensions that exceeds the threshold value and has a level of interference that does not exceed the second threshold value.

14. The network system of claim 1, wherein the level of interference received at the one or more UEs within the first active set comprises a signal-to-leakage ratio (SLR) of the first active set.

15. The network system of claim 14, wherein the SLR of the first active set comprises a ratio of a power of one or more signals transmitted by one or more of the plurality of nodes in the first active set to the one or more UEs within the first active set over a leakage of the one or more signals to one or more UEs not within the first active set.

16. A computer-implemented method comprising:
determining whether a number of available MIMO dimensions in a first active set exceeds a threshold value, wherein the first active set is associated with a node configured to serve one or more user equipment (UE) in the first active set;
determining a level of interference received at one or more UEs within the first active set;
in response to a determination that at least one of (a) the number of available MIMO dimensions in the first active set does not exceed the threshold value or (b) a determination that the level of interference within the first active set exceeds a second threshold value,
determining one or more metrics, each metric associated with the first active set and an active set other than the first active set; and
combining the first active set with an active set associated with the highest metric in the one or more metrics.

17. The computer-implemented method of claim 16, wherein a second node corresponds to a second active set, and wherein a first metric in the one or more metrics is associated with the first active set and the second active set.

18. The computer-implemented method of claim 17, wherein the first metric is based on a number of MIMO dimensions provided by a combination of the node and the second node.

19. The computer-implemented method of claim 18, wherein the number of MIMO dimensions provided by the combination of the node and the second node comprises a number of transmit streams collectively provided by the node and the second node.

20. The computer-implemented method of claim 17, wherein the first metric is based on a signal-to-noise ratio of a signal between the node and a first UE in one or more UEs served by the second node.

21. The computer-implemented method of claim 20, wherein the first metric is further based on a signal-to-noise ratio of a second signal between the second node and a second UE in one or more UEs served by the first node.

22. The computer-implemented method of claim 17, wherein the first metric is based on a signal-to-leakage ratio of an energy of a signal from a combination of the first node and the second node to one or more UEs served by the combination over a leakage of the signal to one or more UEs not served by the combination.

23. The computer-implemented method of claim 17, wherein determining one or more metrics further comprises:
applying, for each UE in one or more UEs served by the second node, a function to a signal-to-noise ratio of a signal between the node and the respective UE served by the second node to form a first value;
summing the first values;
applying, for each UE in one or more UEs served by the node, a function to a signal-to-noise ratio of a signal between the second node and the respective UE served by the node to form a second value;
summing the second values; and
determining the first metric based on the summed first values and the summed second values.

24. Non-transitory, computer-readable storage media comprising computer-executable instructions, wherein the computer-executable instructions, when executed by a scheduler in a baseband unit, cause the baseband unit to:
determine whether a number of available MIMO dimensions in a first active set exceeds a threshold value, wherein the first active set is associated with a node configured to serve one or more user equipment (UE) in the first active set;
determine a level of interference received at one or more UEs within the first active set;
in response to a determination that at least one of (a) the number of available MIMO dimensions in the first active set does not exceed the threshold value or (b) a determination that the level of interference within the first active set exceeds a second threshold value,
determine one or more metrics, each metric associated with the first active set and an active set other than the first active set; and
combine the first active set with an active set associated with the highest metric in the one or more metrics.

* * * * *